(12) United States Patent
Lim et al.

(10) Patent No.: US 9,156,981 B2
(45) Date of Patent: Oct. 13, 2015

(54) MOISTURE CURABLE COMPOSITIONS WITH ENHANCED ELONGATION AND TEAR STRENGTH PROPERTIES

(71) Applicant: Momentive Performance Materials Inc., Albany, NY (US)

(72) Inventors: Thomas Fay-Oy Lim, Killingworth, CT (US); Vikram Kumar, Tarrytown (IN); Martin Wusik, Danbury, CT (US)

(73) Assignee: Momentive Performance Materials Inc., Waterford, NY (US)

( * ) Notice: Subject to any disclaimer, the term of this patent is extended or adjusted under 35 U.S.C. 154(b) by 53 days.

(21) Appl. No.: 13/949,473

(22) Filed: Jul. 24, 2013

(65) Prior Publication Data
US 2015/0031806 A1    Jan. 29, 2015

(51) Int. Cl.
| | |
|---|---|
| *C08F 283/12* | (2006.01) |
| *C08L 75/04* | (2006.01) |
| *C09D 175/04* | (2006.01) |
| *C09J 175/04* | (2006.01) |
| *C08G 18/48* | (2006.01) |
| *C08G 18/50* | (2006.01) |
| *C08G 18/62* | (2006.01) |
| *C08G 18/71* | (2006.01) |
| *C08G 18/75* | (2006.01) |
| *C08G 18/10* | (2006.01) |
| *C08G 18/24* | (2006.01) |
| *C08G 18/38* | (2006.01) |
| *C08L 75/02* | (2006.01) |
| *C08L 75/08* | (2006.01) |
| *C08L 101/10* | (2006.01) |

(52) U.S. Cl.
CPC ............... *C08L 75/04* (2013.01); *C08G 18/10* (2013.01); *C08G 18/246* (2013.01); *C08G 18/3893* (2013.01); *C08G 18/4825* (2013.01); *C08G 18/4854* (2013.01); *C08G 18/5024* (2013.01); *C08G 18/6208* (2013.01); *C08G 18/718* (2013.01); *C08G 18/755* (2013.01); *C08L 75/02* (2013.01); *C08L 75/08* (2013.01); *C08L 101/10* (2013.01); *C09D 175/04* (2013.01); *C09J 175/04* (2013.01)

(58) Field of Classification Search
CPC ........ C08G 77/18; C08G 77/16; C08L 75/04; C08L 83/06
USPC ........................................................ 525/453
See application file for complete search history.

(56) References Cited

U.S. PATENT DOCUMENTS

| | | |
|---|---|---|
| 3,627,722 A | 12/1971 | Seiter |
| 3,829,505 A | 8/1974 | Herold |
| 3,941,849 A | 3/1976 | Herold |
| 4,242,490 A | 12/1980 | Emerson et al. |
| 4,334,036 A | 6/1982 | Yonezawa et al. |
| 4,335,188 A | 6/1982 | Igi et al. |
| 4,371,664 A | 2/1983 | Kato et al. |
| 4,687,851 A | 8/1987 | Laughner |
| 4,975,488 A | 12/1990 | Furukawa et al. |
| 4,985,491 A | 1/1991 | Reisch |
| 5,096,993 A | 3/1992 | Smith et al. |
| 5,100,997 A | 3/1992 | Reisch et al. |
| 5,106,874 A | 4/1992 | Porter et al. |
| 5,116,931 A | 5/1992 | Reisch et al. |
| 5,136,010 A | 8/1992 | Reisch et al. |
| 5,185,420 A | 2/1993 | Smith et al. |
| 5,226,681 A | 7/1993 | Smith et al. |
| 5,298,572 A | 3/1994 | Katz |
| 5,558,806 A | 9/1996 | Policello et al. |
| 5,986,014 A | 11/1999 | Kusakabe et al. |
| 5,990,257 A | 11/1999 | Johnston et al. |
| 6,001,946 A | 12/1999 | Waldman et al. |
| 6,274,688 B1 | 8/2001 | Nakagawa et al. |
| 6,420,492 B1 | 7/2002 | Kusakabe et al. |
| 6,498,210 B1 | 12/2002 | Wang et al. |
| 6,552,118 B2 | 4/2003 | Fujita et al. |
| 7,153,911 B2 | 12/2006 | Yano et al. |
| 7,202,310 B2 | 4/2007 | Kitano et al. |
| 7,223,817 B2 | 5/2007 | Nakagawa et al. |
| 7,319,128 B2 | 1/2008 | Ziche et al. |
| 7,405,259 B2 | 7/2008 | Frye et al. |
| 7,732,554 B2 | 6/2010 | O'Keefe et al. |
| 8,063,140 B2 | 11/2011 | Ramdatt et al. |
| 8,207,252 B2 | 6/2012 | Huang et al. |
| 8,378,037 B2 | 2/2013 | Griswold |
| 2012/0214925 A1 | 8/2012 | Gubbels et al. |

FOREIGN PATENT DOCUMENTS

JP           08 165389      *  6/1996

OTHER PUBLICATIONS

JP 08 165389 Machine translation (1996).*

* cited by examiner

*Primary Examiner* — Kuo-Liang Peng
(74) *Attorney, Agent, or Firm* — Dominick G. Vicari

(57) ABSTRACT

Moisture-curable compositions are provided which comprises a moisture-curable silylated resin, a flexibilizer and at least one curing catalyst. The cured compositions possess enhanced elongation and tear properties, and are highly suitable for applications such as adhesives, sealants, coatings, gaskets, industrial rubber goods, and the like.

24 Claims, No Drawings

MOISTURE CURABLE COMPOSITIONS WITH ENHANCED ELONGATION AND TEAR STRENGTH PROPERTIES

BACKGROUND OF THE INVENTION

1. Field of the Invention

The present invention relates to moisture-curable compositions that upon curing provide cured compositions having enhanced elongation and tear properties. These compositions are useful as coatings, adhesives, sealants and composites.

2. Description of Related Art

Moisture-curable silylated resins are useful as coatings, adhesives, sealants and industrial elastomeric goods. Illustratively, U.S. Pat. No. 3,627,722 describes a sealant made from an isocyanate-terminated polyurethane prepolymer wherein at least five percent of the isocyanate groups are end-blocked with trialkoxysilyl groups. U.S. Pat. No. 5,990,257 describes silylated polyurethane prepolymers derived from polyether polyols possessing very low olefinic unsaturation. The cured silylated polyurethane exhibit improved mechanical properties as low-tack sealants. U.S. Pat. No. 6,498,210 describes silylated polyurethane prepolymer containing unreacted isocyanate groups or low molecular weight terminators. Upon curing, the silylated polymers provide improved tensile strength. U.S. Pat. No. 6,001,946 describes a class of moisture-curable N-silylalkyl-aspartic acid ester-terminated polyurethane prepolymers and cured sealant compositions made therefrom that are said to exhibit improved elongation, tensile strength and tear resistance. U.S. Pat. No. 7,319,128 describes organyloxysilyl-terminated polymers obtained by reacting hydroxyl-terminated organic polymers with isocyanato-functional silanes in the presence of a catalyst.

However, conventional coatings, adhesives and sealants based upon these silylated resins do not always provide a desired combination of the aforementioned physical properties. For example, for windshield adhesives, physical properties such as high elongation and tear strength are desired while other desirable mechanical properties are maintained.

Accordingly, there is a continuing need for moisture-curable compositions having enhanced elongation and tear properties.

SUMMARY OF THE INVENTION

In accordance with one aspect of the invention, there is provided a moisture-curable composition comprising:

(a) a moisture-curable silylated resin having the general Formula (I):

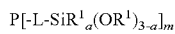   Formula (I)

wherein:

P is a polymer residue derived from at least one addition or condensation monomer;

L is a divalent linking group;

each occurrence of $R^1$ is independently an alkyl group having from 1 to 6 carbon atoms, a phenyl group or an arenyl group having 7 to 12 carbon atoms;

each occurrence of subscript a is independently 0, 1 or 2; and m is an integer from 1 to 15;

(b) a flexibilizer having the general Formula (II):

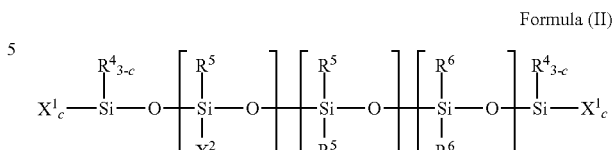

Formula (II)

wherein:

each occurrence of $R^4$ is independently an alkyl group having from 1 to 6 carbon atoms, a phenyl group or an arenyl group having 7 to 12 carbon atoms;

each occurrence of $R^5$ is independently an alkyl group having from 1 to 6 carbon atoms;

each occurrence of $R^6$ is independently a phenyl group or an arenyl group having 7 to 12 carbon atoms;

each occurrence of $X^1$ is independently a hydroxyl group, an alkoxy group having from 1 to 6 carbon atoms, or an alkoxy group having from 1 to 6 carbon atoms and at least one ether or ester functional group;

each occurrence of $X^2$ is independently a hydroxyl group, an alkoxy group having from 1 to 6 carbon atoms, an alkoxy group having from 1 to 6 carbon atoms and at least one ether or ester functional group, or a group with the Formula (IIa):

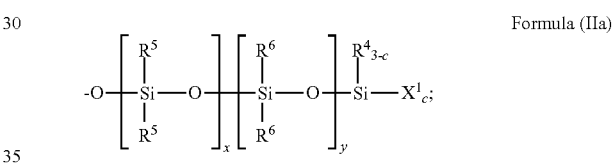

Formula (IIa)

$R^4$, $R^5$ and $R^6$ are the same as defined above;

each occurrence of subscripts c, n, p, q, x and y is independently an integer wherein c is 1 to 3; n is 0 to 500, p is 1 to 500, q is 0 to 10, x is 0 to 50, and y is 0 to 50 with the provisos that (1) the molar ratio of n to p is from 0 to 15, and (2) the molar ratio of q to p is from 0 to 1; and, (c) at least one curing catalyst.

The present invention provides moisture curable compositions having enhanced elongation and tear properties. The moisture curable compositions of the present invention are especially useful for the manufacture of sealants, coatings, adhesives, gaskets, and the like.

DETAILED DESCRIPTION OF PREFERRED EMBODIMENTS

In the specification and claims herein, the following terms and expressions are to be understood as indicated herein below.

As used in the specification and including the appended claims, the singular forms "a", "an", and "the" include the plural, and reference to a particular numerical value includes at least that particular value unless the context clearly indicates otherwise.

Other than in the working examples or where otherwise indicated, numerical values and ranges of numerical values herein are to be understood as including the indicated value(s) and the value(s) approximate thereto. When such a range is expressed, one embodiment includes the specifically indicated value(s) and another embodiment includes the value(s) approximate thereto.

It will also be understood that any numerical range recited herein is intended to include all sub-ranges within that range and any combination of end points of said ranges or sub-ranges.

All methods described herein may be performed in any suitable order unless otherwise indicated or clearly contrary to context. The use herein of any and all examples or exemplification language (for example, such as), is intended merely to better illustrate the invention and does not pose a limitation on the scope of the invention unless otherwise claimed. No language in the specification should be construed as indicating any non-claimed element as essential to the practice of the invention.

As used herein, the terms "comprising," "including," "containing," "characterized by" and grammatical equivalents thereof are inclusive or open-ended terms that do not exclude additional, unrecited elements or method steps and are also to be understood as including the more restrictive terms "consisting of" and "consisting essentially of".

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

As used herein, the term "monovalent" in reference to a hydrocarbon radical means that the radical is capable of forming one covalent bond per radical.

As used herein, the term "hydrocarbon radical" includes linear hydrocarbon radicals, branched hydrocarbon radicals, acyclic hydrocarbon radicals, alicyclic hydrocarbon radicals and aromatic hydrocarbon radicals.

As used herein, the term "acyclic hydrocarbon radical" means any straight chain or branched hydrocarbon radical, preferably containing from 1 to 60 carbon atoms per radical, which may be saturated or unsaturated. Suitable monovalent acyclic hydrocarbon radicals may include, for example, alkyl, alkenyl and alkynyl group, such as, for example, methyl, ethyl, sec-butyl, tert-butyl, octyl, decyl, dodecyl, cetyl, stearyl, ethenyl, propenyl, butynyl. Suitable divalent acyclic hydrocarbon radicals include, for example, linear or branched alkylene radicals, such as, for example, methylene, dimethylene, trimethylene, decamethylene, ethylethylene, 2-methyltrimethylene and 2,2-dimethyltrimethylene. Suitable trivalent acyclic hydrocarbon radicals include, for example, alkanetriyl radicals, such as, for example, 1,1,2-ethanetriyl, 1,2,4-butanetriyl, 1,2,8-octanetriyl and 1,2,4-cyclohexanetriyl.

As used herein the term "alkyl" means any saturated straight or branched monovalent hydrocarbon radical. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl and dodecyl.

As used herein the term "alkenyl" means any straight or branched monovalent terminally unsaturated hydrocarbon radical, preferably containing from 2 to 10 carbon atoms per radical, such as, for example, ethenyl, 2-propenyl, 3-butenyl, 5-hexenyl and 7-octenyl.

As used herein, the term "alicyclic hydrocarbon radical" means a radical containing one or more saturated hydrocarbon rings, preferably containing from 4 to 12 carbon atoms per ring, per radical which may optionally be substituted on one or more of the rings with one or more alkyl radicals, each preferably containing from 2 to 6 carbon atoms per alkyl radical, and which, in the case of an alicyclic hydrocarbon radical containing two or more rings, the rings may be fused rings. Suitable monovalent alicyclic hydrocarbon radicals include, for example, cycloalkyl groups, such as cyclohexyl and cyclooctyl. Suitable divalent hydrocarbon radicals include, saturated or unsaturated divalent monocyclic hydrocarbon radicals, such as, for example, 1,4-cyclohexylene. Suitable trivalent alicyclic hydrocarbon radicals include, for example, cycloalkanetriyl radicals such as, for example, 1-dimethylene-2,4-cyclohexylene and 1-methylethylene-3-methyl-3,4-cyclohexylene.

As used herein, the term "aromatic hydrocarbon radical" means a hydrocarbon radical containing one or more aromatic rings per radical, which may, optionally, be substituted on the aromatic rings with one or more alkyl radicals, each preferably containing from 2 to 6 carbon atoms per alkyl radical, and which, in the case of a monovalent aromatic hydrocarbon radical containing two or more rings, the rings may be fused rings. Suitable monovalent aromatic hydrocarbon radicals include, for example, phenyl, tolyl, 2,4,6-trimethylphenyl, 1,2-isopropylmethylphenyl, 1-pentalenyl, naphthyl and anthryl, as well as aralkyl radicals such as, for example, 2-phenylethyl. Suitable divalent aromatic hydrocarbon radicals include, for example, divalent monocyclic arenes such as, for example, 1,2-phenylene, 1,4-phenylene, 4-methyl-1,2-phenylene and phenylmethylene. Suitable trivalent aromatic hydrocarbon radicals include, for example, trivalent monocyclic arenes such as, for example, 1-trimethylene-3,5-phenylene.

Moisture-Curable Silylated Resin of Formula (I)

The moisture-curable silylated resin component of the moisture-curable composition of the invention has the general Formula (I):

$$P[-L-SiR^1_a(OR^1)_{3-a}]_m \qquad \text{Formula (I)}$$

wherein:

P is a polymer residue derived from at least one addition or condensation monomer;

L is a divalent linking group;

each occurrence of $R^1$ is independently an alkyl group having from 1 to 6 carbon atoms, a phenyl group or an arenyl group having 7 to 12 carbon atoms;

each occurrence of subscript a is independently 0, 1 or 2; and, m is an integer from 1 to 15.

In certain embodiments of the moisture-curable composition of the invention, in the moisture-curable silylated resin of Formula (I), each $R^1$ is independently methyl or ethyl, a is 0 or 1 and m is 2 to 6.

In certain embodiments of the moisture-curable composition of the invention, in the moisture-curable silylated resin of Formula (I), linking group L has the general Formula (Ia):

$$-[A^1-C(O)-A^2]_b-R^2- \qquad \text{Formula (Ia);}$$

wherein:

each occurrence of $R^2$ is independently a divalent hydrocarbylene group containing from 1 to 12 carbon atoms;

each occurrence of $A^1$ is independently selected from divalent oxygen (—O—), sulfur (—S—) or substituted nitrogen of the structure (—)$_2$N$R^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the provisos that when $A^1$ is oxygen or sulfur, then $A^2$ is (—)$_2$N$R^3$ and when a is 0, then $A^1$ is oxygen;

each occurrence of $A^2$ is independently selected from divalent oxygen (—O—), sulfur (—S—) or substituted nitrogen of the structure (—)$_2$N$R^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the proviso that when $A^2$ is oxygen or sulfur, then $A^1$ is (—)$_2NR^3$; and, subscript b is 0 or 1.

In one embodiment, divalent hydrocarbylene group $R^2$ may be optionally substituted or interrupted with one or more hetero atoms and/or functional groups that do not interfere with the cure mechanism of the moisture-curable composition and/or the proper functioning of an optional component contained therein such as the adhesion promoter described below. Thus, divalent hydrocarbylene group $R^2$ can, for example, contain functionality such as hydroxyalkyl, cyanoalkyl, carboxyalkyl, alkyloxy, oxalkyl, alkylcarbonyloxaalkylene, carboxamide and haloalkyl, such as hydroxypropyl, cyanoethyl, butoxy-2,5,8-trioxandecanyl, carboxymethyl, chloromethyl, 3,3,3-fluoropropyl, methyleneoxypropylene and 1,2,6-triyl-4-oxahexane.

The silylatable polymer from which the moisture-curable silylated resin of Formula (I) is derived, i.e., the polymer providing polymer residue P of Formula (I), can be selected from among any of those heretofore known for use in the manufacture of moisture-curable silylated resins. Thus, for example, the silylatable polymer can possess a polymer backbone which is one of a polyether, polyester, polyether-co-polyester, polyester-co-polyether, polythioether, polyamine, polyamide, polyester-co-polyamide, polyacrylate, polyacetal, polycarbonate, polybutadiene, polyolefin, polyurethane, polyurea, and the like.

More particularly, the silylatable polymer can be selected from the group consisting of polyether polyol, polyester polyol, hydroxyl-terminated polyacrylate, hydroxyl-terminated polybutadiene, hydridosiloxane, polyolefin possessing terminal olefinic unsaturation, polyether possessing terminal olefinic unsaturation, hydroxyl-terminated and isocyanate-terminated polyurethanes derived from the reaction of polyether polyol, polyester polyol, hydroxyl-terminated polyacrylate, hydroxyl-terminated polybutadiene, etc., with polyisocyanate, primary and/or secondary amine-terminated polyurea derived from the reaction of amine-terminated polyether, amine-terminated polyester, etc., with polyisocyanate, and similar such silylatable polymers.

Moisture-curable silylated resin of Formula (I) can be obtained by silylating these and similar silylatable polymers in any known or conventional manner, for example, a polymer possessing active hydrogen-containing functionality, i.e., hydroxyl, mercapto, primary amine and/or secondary amine functionality, can be silylated by reaction with an isocyanatosilane, an isocyanate-terminated polymer can be silylated with a silane possessing functionality that is reactive for isocyanate such as mercapto or amine functionality, and an olefinically unsaturated polymer can be silylated by reaction with a hydridosilane (hydrosilane) under hydrosilation reaction conditions.

In one embodiment, polymer residue P in the moisture-curable resin of Formula (I) possesses a number average molecular weight of from 500 to 50,000. In another embodiment, polymer residue P possesses a number average molecular weight of from 2,000 to 20,000.

The preparation of the moisture-curable silylated resins of Formula (I) can be carried out in a batch or continuous process.

The amount of moisture-curable silylated resin that is used in the compositions is from 10 to 98 percent by weight, based on of the total weight of the composition, more specifically of from 20 to 70 percent by weight, based on of the total weight of the composition.

Some particularly useful moisture-curable silylated resins of Formula (I) and their preparation will now be more fully described.

1. Moisture-Curable Silylated Resins Obtained from Active Hydrogen-Containing Silylatable Polymers Moisture-curable silylated resins of Formula (I) can be obtained by the silylation of one or a mixture of active hydrogen-containing silylatable polymers such as (i) polyether polyols; (ii) polyester polyols; (iii) hydroxyl-terminated polybutadienes; (iv) hydroxyl-terminated polyurethanes derived from, for example, polyols (i), (ii) and/or (iii); and, (v) primary and secondary amine-terminated polyureas and/or polyurethane-polyurea, with isocyanatosilane. Preparation of the silylated resins can be carried out in the presence or absence of a catalyst.

Specific suitable polyols include poly(oxyalkylene)ether diols (i.e., polyether diols), in particular, poly(oxyethylene) ether diols, poly(oxypropylene)ether diols and poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, polybutadiene diols, and the like. In one embodiment of the invention, the polyols used in the production of the moisture-curable silylated resins are poly(oxyethylene)ether diols with number average molecular weights (Mn) between 500 grams per mole and 25,000 grams per mole. In another embodiment of the invention, the polyols used in the production of the moisture-curable silylated resins are poly(oxypropylene)ether diols with number average molecular weights between 1,000 grams per mole and 20,000 grams per mole. The number average molecular weights are determined from the hydroxyl number of the polyols. Mixtures of polyols of various structures, molecular weights and/or functionalities can also be used.

The polyether polyols can have a functionality up to 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242, 490, 4,335,188, 4,687,851, 4,985,491, 5,096,993, 5,100,997, 5,106,874, 5,116,931, 5,136,010, 5,185,420 and 5,266,681, the entire contents of which are incorporated by reference herein. Polyether polyols produced in the presence of such catalysts tend to have high molecular weights and low levels of unsaturation, properties which are believed to account for the improved performance of compositions derived therefrom. The polyether polyols preferably have a number average molecular weight of from 1,000 grams per mole to 25,000 grams per mole, more preferably from 2,000 grams per mole to 20,000 grams per mole and more preferably still from 4,000 grams per mole to 18,000 gams per mole. The levels of terminal ethylenic unsaturation are generally less than 0.2, preferably less than 0.02, and more preferably less than 0.008 milliequivalents per gram (meq/g) of polyol. Examples of commercially available diols that are suitable for making the moisture-curable silylated resins herein include, but are not limited to, ARCOL® R-1819 (number average molecular weight of 8,000 grams per mole, available from Bayer Material Science), E-2204 (number average molecular weight of 4,000 grams per mole) and ARCOL® E-2211 (number average molecular weight of 11,000 grams per mole, available from Bayer Material Science).

Among the hydroxyl-terminated polybutadienes that are useful for preparing the moisture-curable silylated resins herein are those possessing a number average molecular weight of from 500 grams per mole to 10,000 grams per mole and advantageously from 800 grams per mole to 5,000 grams per mole, a primary hydroxyl group content of from 0.1 to 6.0 milliequivalents per gram and advantageously from 0.3 to 1.8 milliequivalents per gram, a degree of hydrogenation of from 0 up to 100 percent of the olefinic sites present and an average content of copolymerized additional monomer(s) of from 0 up to 50 weight percent.

Hydroxyl-terminated polybutadienes of the above-described type, averaging more than one predominantly primary hydroxyl group per molecule, for example, averaging from 1.7 to 3 or more primary hydroxyl groups per molecule, are suitably employed herein. More specifically, the hydroxyl-terminated polybutadienes possess an average of at least 2, and advantageously from 2.4 up to 2.8, hydroxyl groups per molecule, the hydroxyl groups being predominantly in terminal allylic positions on the main, i.e., generally the longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the butadiene polymers employed in this invention, the number and location of the hydroxyl groups and the molecular weight of the butadiene polymers will be influenced by the process employed for their manufacture, the details of which are known in the art.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers which can confer particularly desirable properties upon the silylated polymers herein. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Silylatable hydroxyl-terminated polyurethane prepolymers can be obtained in employing polyols such as those described above, polyisocyanates and optional catalysts (preferably condensation catalysts), the proportions of polyol and polyisocyanate being such as to result in hydroxyl-termination in the resulting prepolymer. Thus, for example, in the case of a diol and a diisocyanate, a molar excess of the former will be used thereby resulting in hydroxyl-terminated polyurethane prepolymer.

The hydroxyl-terminated polyurethane prepolymer can also be prepared from a reaction mixture containing one or more chain extenders and/or one or more other polyols.

Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols can be chosen from polyols described above and include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates used in preparing silylatable hydroxyl-terminated polyurethane prepolymers include any of the known and conventional organic polyisocyanates, especially organic diisocyanates, from which polyurethane polymers have heretofore been prepared. Useful diisocyanates include, for example, 2,4-toluene diisocyanate, 2,6-toluene diisocyanate, 4,4'-diphenyl-methanediisocyanate, isophorone diisocyanate, dicyclohexylmethane-4,4'-diisocyanate, various liquid diphenylmethane-diisocyantes containing a mixture of 2,4- and 4,4'-isomers, Desmodur N® (Bayer) and the like, and mixtures thereof. Isophorone diisocyanate (IPDI) is especially advantageous for use in preparing the silylatable polyurethane prepolymers herein.

Suitable catalysts useful in the preparation of the silylatable hydroxyl-terminated polyurethane prepolymers are dialkyltin dicarboxylates such as dibutyltin dilaurate and dibutyltin acetate, tertiary amines, the stannous salts of carboxylic acids such as stannous octoate and stannous acetate, and the like. In one embodiment of the invention, dibutyltin dilaurate catalyst is used in the production of the moisture-curable silylated resins. Other useful catalysts include zirconium-containing and bismuth-containing complexes such as KAT XC6212, K-KAT XC-A209 and K-KAT 348, supplied by King Industries, Inc., titanium chelates such as the TYZOR® types, available from DuPont company, and the KR types, available from Kenrich Petrochemical, Inc., and other organometallic catalysts, for example, those containing a metal such as Al, Zn, Co, Ni, Fe, and the like.

As indicated above, silylatable hydroxyl-terminated polyurethane prepolymers can be prepared by the reaction of an organic polyisocyanate, for example, a diisocyanate such as any of those mentioned above, and advantageously isophorone diisocyanate, with a stoichiometric excess of the selected polyol(s). Depending on the reactivity of the respective reactants, a catalyst such as any of those mentioned above can be employed. The reaction temperature is typically in the range of from 60° C. to 90° C.; the reaction time is typically on the order of from 2 to 8 hours. The reaction mixture can also contain one or more chain extenders and/or other polyols such as any of those mentioned above.

To prepare the silylatable hydroxyl group-terminated polyurethane prepolymers, at least a slight molar excess of the hydroxyl equivalents of the polyols (OH groups) with respect to the isocyanate equivalents of the polyisocyanate (NCO groups) is employed to terminate the prepolymer chains with hydroxyl groups. Advantageously, the molar ratio of NCO to OH is from 0.3 to 0.95, and more preferably from 0.5 to 0.90, depending on the specific polyols or mixture of polyols and/or chain extenders employed.

Suitable silylating reactants used in preparing the moisture-curable silylated resins of Formula (I) are the isocyanatosilanes of the general formula:

$$OCN-R^{14}-Si(R^{15})_z(OR^{16})_{3-z}$$

wherein $R^{14}$ is an alkylene group of up to 12 carbon atoms, optionally containing one or more heteroatoms, each $R^{15}$ is the same or different alkyl or aryl group of up to 8 carbon atoms, each $R^{16}$ is the same or different alkyl group of up to 6 carbon atoms and z is 0, 1 or 2. In one embodiment, $R^{14}$ possesses 1 to 4 carbon atoms, each $R^{16}$ is the same or different methyl, ethyl, propyl or isopropyl group and z is 0.

Specific isocyanatosilanes that can be used herein to react with the aforementioned polyols and hydroxyl-terminated polyurethanes to provide moisture-curable silylated resins of Formula (I) include isocyanatomethyltrimethoxysilane, 3-isocyanatopropyltrimethoxysilane, isocyanatoisopropyltrimethoxysilane, 4-isocyanato-n-butyltrimethoxysilane, isocyanato-t-butyltrimethoxysilane, isocyanatomethylmethyldimethoxysilane, 3-isocyanatopropylmethyldimethoxysilane, 3-isocyanatopropyltriethoxysilane, isocyanatoisopropyltriethoxysilane, 4-isocyanato-n-butyltriethoxysilane, isocyanato-t-butyltriethoxysilane, and the like.

Suitable catalysts useful in the preparation of the moisture-curable silylated resin of Formula (I) include dialkyltin dicarboxylates such as dibutyltin dilaurate and dibutyltin acetate, tertiary amines, the stannous salts of carboxylic acids such as stannous octoate and stannous acetate, and the like. In one embodiment of the invention, dibutyltin dilaurate catalyst is used in the production of the moisture-curable silylated resins. Other useful catalysts include zirconium-containing and bismuth-containing complexes such as KAT XC6212, K-KAT XC-A209 and K-KAT 348, supplied by King Industries, Inc., titanium chelates such as the TYZOR® types, available from DuPont company, and the KR types, available from Kenrich Petrochemical, Inc., and other organometallic catalysts, for example, those containing a metal such as Al, Zn, Co, Ni, Fe, and the like.

Depending on the reactivity of the respective reactants, a catalyst such as any of those mentioned above can be employed. The reaction temperature is typically in the range of from 60° C. to 90° C.; the reaction time is typically on the order of from 2 to 8 hours. The reaction mixture can also contain one or more chain extenders and/or other polyols such as any of those mentioned above.

To prepare the moisture-curable silylated resins of Formula (I), the isocyanatosilane can be used in a slight molar excess or a slight molar deficiency of the hydroxyl equivalents of the polyols (OH groups) with respect to the NCO isocyanate equivalents of the isocyanatosilane (NCO groups). Advantageously, the molar ratio of NCO to OH is from 0.7 to 1.5, more preferably from 0.9 to 1.1 and more specifically still from 0.98 to 1.02.

Particularly useful moisture-curable silylated resins of Formula (I) are prepared from polypropylene diols, aliphatic diisocyanates and 3-isocyanatopropyltrimethoxysilane. The polypropylene diols have levels of terminal ethylenic unsaturation less than 0.02, and more advantageously less than 0.008, milliequivalents per gram (meq/g) of polyol and number average molecular weight, as determined by hydroxyl end-group analysis, of from 5,000 to 15,000 grams per mole. The molar ratio of isocyanate of the isocyanatosilane (NCO) to the hydroxyl of the hydroxyl-terminated polyurethane resin is from 0.9 to 1.05, more particularly from 1.0 to 1.5.

It is preferred that silylation of the hydroxyl-terminated silylatable resin of Formula (I) be substantially complete, i.e., that essentially no hydroxyl groups be present following silylation, where the silylated resins are to be used for sealing and coating applications.

2. Moisture-Curable Silylated Resin Obtained from Isocyanate-Terminated Polyurethanes/Polyureas Isocyanate-terminated polyurethanes can be obtained by reacting one or more polyols, advantageously, diols, with one or more polyisocyanates, advantageously, diisocyanates, in such proportions that the resulting prepolymers will be terminated with isocyanate. In the case of the reaction of a diol with a diisocyanate, a molar excess of diisocyanate is employed.

Included among the polyols that can be utilized for the preparation of the isocyanate-terminated polyurethane prepolymer are polyether polyols, polyester polyols such as the hydroxyl-terminated polycaprolactones, polyetherester polyols such as those obtained from the reaction of polyether polyol with e-caprolactone and polyesterether polyols such as those obtained from the reaction of hydroxyl-terminated polycaprolactones with one or more alkylene oxides such as ethylene oxide and propylene oxide.

Specific suitable polyols are described above and include the poly(oxyalkylene)ether diols (i.e., polyether diols), in particular, the poly(oxyethylene)ether diols, the poly(oxypropylene)ether diols and the poly(oxyethylene-oxypropylene)ether diols, poly(oxyalkylene)ether triols, poly(tetramethylene)ether glycols, polyacetals, polyhydroxy polyacrylates, polyhydroxy polyester amides, polyhydroxy polythioethers, polycaprolactone diols and triols, polybutadiene diols, and the like. In one embodiment of the invention, the polyols used in the production of the isocyanate-terminated polyurethane prepolymers are poly(oxyethylene)ether diols with number average molecular weights (Mn) between 500 grams per mole and 25,000 grams per mole. In another embodiment of the invention, the polyols used in the production of the isocyanate-terminated polyurethane prepolymers are poly(oxypropylene)ether diols with equivalent weights between 1,000 grams per mole to 20,000 grams per mole. Mixtures of polyols of various structures, molecular weights and/or functionalities can also be used.

The polyether polyols can have a functionality up to 8 but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of which are incorporated here by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of from 1,000 grams per mole to 25,000 grams per mole, more preferably from 2,000 grams per mole to 20,000 grams per mole, and even more preferably from 4,000 grams per mole to 18,000 grams per mole. Examples of commercially available diols that are suitable for making the isocyanate-terminated polyurethane include, but are not limited to, ARCOL® R-1819 (number average molecular weight of 8.000 grams per mole, available from Bayer Material Science), E-2204 (number average molecular weight of 4,000 grams per mole), and ARCOL® E-2211 (number average molecular weight of 11,000 grams per mole, available from Bayer Material Science).

Among the hydroxyl-terminated polybutadienes that are useful for preparing the moisture-curable silylated resins are those possessing a number average molecular weight (Mn) of from 500 grams per mole to 10,000 grams per mole, and advantageously from 800 grams per mole to 5,000 grams per mole, a primary hydroxyl group content of from 0.1 to 6.0 milliequivalents per gram, and advantageously from 0.3 to 1.8 milliequivalents per gram, a degree of hydrogenation of from 0 up to 100 percent of the olefinic sites present and an average content of copolymerized additional monomer(s) of from 0 up to 50 weight percent.

Hydroxyl-terminated butadienes of the above-described type, averaging more than one predominantly primary hydroxyl group per molecule, for example, averaging from 1.7 to 3 or more primary hydroxyl groups per molecule, are suitably employed herein. More specifically, the hydroxyl-terminated polybutadienes will possess an average of at least 2, and advantageously from 2.4 up to 2.8, hydroxyl groups per molecule, the hydroxyl groups being predominantly in terminal allylic positions on the main, i.e., generally longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the butadiene polymers employed in this invention, the number and location of the hydroxyl groups and the molecular weight of the butadiene polymers will be influenced by the process employed for their manufacture, the details of which are known in the art.

Hydroxyl-terminated polybutadienes possessing these characteristics are commercially available from several sources and are therefore conveniently employed herein.

The useful hydroxyl-terminated polybutadienes herein can also incorporate one or more other copolymerizable monomers which can confer particularly desirable properties upon the silylated polymers herein and the pressure sensitive adhesive compositions prepared therewith. The total amount of copolymerized monomer will not exceed, on average, 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Any of numerous polyisocyanates, advantageously, diisocyanates, and mixtures thereof, can be used to provide the isocyanate-terminated polyurethanes. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate ("IPDI"), dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated polyurethanes described above must contain functionality that is reactive with isocyanate and at least one readily hydrolysable and subsequently crosslinkable group, for example, alkoxysilyl. Particularly useful silylation reactants are the silanes of the general formula:

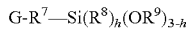

$$G-R^7-Si(R^8)_h(OR^9)_{3-h}$$

wherein G is an active hydrogen-containing group that is reactive for isocyanate, for example, —SH or —NHR$^{10}$ in which R$^{10}$ is H, a monovalent hydrocarbon group of up to 8 carbon atoms or —R$^{11}$—Si(R$^{12}$)$_j$(OR$^{13}$)$_{3-j}$, R$^7$ and R$^{11}$ each is the same or different divalent hydrocarbon group of up to 12 carbon atoms, optionally containing one or more heteroatoms, each R$^8$ and R$^{12}$ is the same or different monovalent hydrocarbon group of up to 8 carbon atoms, each R$^9$ and R$^{13}$ is the same or different alkyl group of up to 6 carbon atoms and h and j each, independently, is 0, 1 or 2.

Specific silanes for use herein include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tris-(2-ethylhexoxy)silane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyltrimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxy-silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltri-methoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltri-methoxysilane.

A catalyst will ordinarily be used in the preparation of the isocyanate-terminated polyurethanes. Advantageously, condensation catalysts are employed since these will also catalyze the cure (hydrolysis followed by crosslinking) of the moisture-curable silylated resin of Formula (I) component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the invention, dibutyltin dilaurate catalyst is used in the production of the PUR polymer. Other useful catalysts include zirconium-containing and bismuth-containing complexes such as KAT XC6212, K-KAT XC-A209 and K-KAT 348, supplied by King Industries, Inc., titanium chelates such as the TYZOR® types, available from DuPont company, and the KR types, available from Kenrich Petrochemical, Inc., and other organometallic catalysts, for example, those containing a metal such as Al, Zn, Co, Ni, Fe, and the like.

Similar to the preparation of isocyanate-terminated polyurethanes, supra, isocyanate-terminated polyureas and polyurethaneureas contain one or more urethane can be prepared by reacting one or more primary and/or secondary amine-terminated polymers or mixtures of one or more such polymers with one or more polyols with polyisocyanate Silylation of isocyanate-terminated polyureas and polyurethaneureas can be carried out with isocyanate-reactive silanes such as described above in connection with the silylation of the isocyanate-terminated polyurethanes, supra.

3. Moisture-Curable Silylated Resins Obtained from Polymers Possessing Terminal Olefinic Unsaturation Moisture-curable silylated resin of Formula (I) can be obtained by hydrosilating a polymer possessing terminal olefinic unsaturation with a hydridosilane (hydrosilane or hydrogensilane), for example, as disclosed, inter alia, in aforementioned U.S. Pat. No. 4,975,488 and in U.S. Pat. Nos. 4,371,664; 4,334,036; 5,298,572; 5,986,014; 6,274,688; 6,420,492; 6,552,118; 7,153,911; 7,202,310; and 7,223,817, the entire contents of which are incorporated by reference herein.

Flexibilizer of Formula (II)

The flexibilizer of Formula (II) is a polysiloxane compound having the general Formula (II):

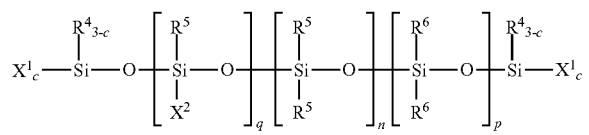

Formula (II)

wherein:

each occurrence of $R^4$ is independently an alkyl group having from 1 to 6 carbon atoms, a phenyl group or an arenyl group having 7 to 12 carbon atoms;

each occurrence of $R^5$ is independently an alkyl group having from 1 to 6 carbon atoms;

each occurrence of $R^6$ is independently a phenyl group or an arenyl group having 7 to 12 carbon atoms;

each $X^1$ is independently a hydroxyl group, an alkoxy group having from 1 to 6 carbon atoms, or an alkoxy group having from 1 to 6 carbon atoms and at least one ether or ester functional group;

each $X^2$ is independently a hydroxyl group, an alkoxy group having from 1 to 6 carbon atoms, an alkoxy group having from 1 to 6 carbon atoms and at least one ether or ester functional group, or a group with the Formula (IIa):

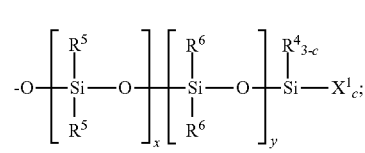

Formula (IIa)

$R^4$, $R^5$ and $R^6$ are the same as defined above;

each occurrence of subscripts c, n, p, q, x and y is independently an integer wherein c is 1 to 3; n is 0 to 500; p is 2 to 500, q is 0 to 10, x is 0 to 50; and y is 0 to 50, with the provisos that (1) the molar ratio of n to p is from 0 to 15, and (2) the molar ratio of q to p is from 0 to 1.

The repeat units of general Formula (IIa) may be oriented in blocks or randomly, and is generally a mixture of components with the structure of Formula (IIa).

In certain embodiments of the moisture-curable composition of this invention, in the flexibilizer of Formula (II), each occurrence of $X^1$ is independently hydroxyl, methoxy, ethoxy, propoxy or isopropoxy; $R^4$ is methyl or phenyl; $R^5$ is methyl; $R^6$ is phenyl; n is 1 to 100; p is 2 to 100; q is 0; and the molar ratio of n to p is from 1 to 10. Preferably, $X^1$ is hydroxyl, methoxy or ethoxy; q is 0; and the molar ratio of n to p is 2 to 7.

Specific examples of the flexibilizers include HO—Si$(CH_3)_2$—O—$[Si(CH_3)_2O]_r$—$[Si(Ph)_2O]$—Si$(CH_3)_2$—OH where r/s is 4.42, $CH_3O$—Si$(CH_3)_2$—O—$[Si(CH_3)_2O]_u$—$[Si(Ph)_2O]_w$—Si$(CH_3)_2$—$OCH_3$, where u/w is 2.99, or mixtures thereof.

In another embodiment, the flexibilizer of Formula (II) has a silanol content or a $SiX^1$ content of from 2 to 15 mole %, and preferably from 5 to 10 mole %, based upon the total number of silicon atoms and determined by $^{29}Si$ NMR spectroscopy. In still another embodiment, the flexibilizer has a weight average molecular weight of from 500 to 50,000, preferably from 1,000 to 10,000, as determined in accordance with DIN Standard 55672 (1) using polystyrene standards.

The amount of flexibilizer of Formula (II) that is used in the compositions is from 1 to 50 parts by weight per one hundred parts of the moisture-curable silylated resin of Formula (I), more specifically of from 1 to 30 parts by weight per one hundred parts of the moisture-curable silylated resin.

Curing Catalyst

Catalysts typically used in the composition of the invention to catalyze the curing reaction of moisture-curable resin of Formula (I) include metal-containing and non-metal-containing catalysts. Examples of the metal portion of the catalysts include tin, titanium, zirconium, lead, iron cobalt, antimony, manganese, bismuth and zinc compounds. Other suitable non-limiting examples of catalysts used for making polyurethane polymer are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_{2++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to 18 carbon atoms, and reaction products of alcoholates of various metals with carboxylic acids, beta-diketones, and 2-(N,N-dialkylamino)alkanols, such as well known chelates of titanium obtained by this or equivalent procedures.

Additional useful catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The amount of catalyst that generally used in the compositions can be from 0.0011 to 10 parts by weight per one hundred parts of the moisture-curable silylated resin of Formula (I), and more specifically, from 0.1 to 0.15 parts by weight per one hundred parts of the moisture-curable silylated resin.

Optional Components

Optional components that can be incorporated in the moisture-curable compositions of the invention include organic and inorganic compounds that contribute to the processing, flexibility and/or curing of the compositions and/or their cured properties. Optional components include organic solvent, polysiloxane resin other than Formula (II), isocyanate-reactive scavenging agent, water scavenger agent, desiccant, non-silicon-based epoxy hardener, surfactant, colorant, plasticizer, extender, filler, reinforcing agent, adhesion promoter, organic resin modifier, and UV stabilizer, wetting agent, flow and leveling additive, thixotrope, defoamer, and the like.

Organic solvents are used to lower the viscosity and improve the flow properties of the uncured composition, which are especially useful when the composition is used as a coating. A variety of solvents may be mentioned as exemplary, for example, alcohols, glycols, triols, polyols, glycol ethers, esters, ketones, hydrocarbon, and the like.

Representative and non-limiting examples of specific solvents include mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols such are propylene glycol, 1,3-butanediol, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy)ethanol (butyl carbitol), di(propylene glycol) butyl ether, tri(ethylene glycol) monomethyl ether, tri(ethylene glycol) monoethyl ether, tri(ethylene glycol) monobutyl ether, poly(ethylene glycol) methyl ether, poly(ethylene glycol) dimethylether, poly(ethylene glycol-co-propylene glycol), poly(ethylene glycol-co-propylene glycol) monobutyl ether, poly(propylene glycol) monobutyl ether, di(propylene glycol) dimethylether; esters including methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate (1-methoxy-2-propanol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent can be present in the moisture-curable composition of the invention in an amount ranging from 1 to 80 percent by weight, advantageously from 10 to 30 percent by weight, and in some embodiments, from 10 to 25 percent by weight, based on the total weight of the composition.

Surfactants may be used to aid in the wetting and leveling of the moisture-curable composition of the invention especially where the composition is used as a coating. Useful surfactants include nonionic, cationic, anionic, amphoteric and/or zwitterionic surfactants. The surfactants are typically hydrocarbon-based, silicone-based or fluorocarbon-based. Useful surfactants having short chain hydrophobes are described in U.S. Pat. No. 5,558,806 the entire contents of which are incorporated by reference herein. Other useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative, non-limiting examples of surfactants include alkyl acetylenic diols sold by Air Products under the trade name SURFONYL®, pyrrilodone-based surfactants sold by ISP under the trade name SURFADONE-LP® 100, 2-ethyl hexyl sulfate, isodecyl alcohol ethoxylates sold by Rhodia under the trade name RHODASURF® DA 530, ethylene diamine alkoxylates sold by BASF under the trade name TETRONICS®, ethylene oxide/propylene oxide copolymers sold by BASF under the trade name PLURONICS®, and diphenyl ether Gemini type surfactants sold by Dow Chemical Corporation under the trade name DOWFAX®.

In general, the moisture-curable compositions herein can contain the optional surfactant(s) in an amount of from 0.01 to 5 weight percent, advantageously from 0.05 to 2 weight percent and in certain embodiments, from 0.1 to 1 weight percent based on the total weight of the composition.

The moisture-curable composition of the invention can include a colorant. As used herein, the term "colorant" means any substance that imparts color and/or other opacity and/or other visual effect to the composition. The colorant can be added to the composition in any suitable form such as discrete particles, dispersions, solutions, flakes, etc. A single colorant or a mixture of two or more colorants can be used in the moisture-curable composition of the invention.

Useful colorants include pigments, dyes and tints such as those used in the paint industry and/or listed in the Dry Color Manufacturers Association (DCMA), as well as special-effect materials. A useful type of colorant can be a finely divided solid powder that is insoluble but wettable under the conditions of use. A colorant can be organic or inorganic and can be agglomerated or non-agglomerated. Colorants can be incorporated into the moisture-curable compositions by use of a grinding vehicle such as an acrylic grinding vehicle the use of which is familiar to those skilled in the art.

Illustrative useful pigments and pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Useful dyes include, but are not limited to, those that are solvent and/or aqueous based such as phthalo green or blue, iron oxide, bismuth vanadate, anthraquinone, perylene, aluminum and quinacridone.

Useful tints include, but are not limited to, pigments dispersed in water-based or water miscible carriers such as AQUA-CHEM® 896 commercially available from Degussa, Inc., CHARISMA COLORANTS® and MAXITONER INDUSTRIAL COLORANTS® commercially available from Accurate Dispersions division of Eastman Chemical, Inc.

In general, the colorant can be present in the moisture-curable composition in any amount that is sufficient to impart the desired visual and/or color effect. The colorant can comprise from, for example, 1 to 65 weight percent of the moisture-curable composition, such as from 3 to 40 weight percent or 5 to 35 weight percent thereof based on the total weight of the composition.

The moisture-curable composition of the invention can include a filler. The filler of the composition can be any inorganic or organic filler that reinforces and/or extends the moisture-curable composition. Useful fillers include, for example, reinforcing fillers such as carbon black, fumed silica, precipitated silica, clays, talc, aluminum silicates, metal oxides and hydroxides, and extending fillers such as treated and untreated calcium carbonates, and the like. Fillers can be in the form of powders, particulates, aggregates, agglomerates, platelets, fibers, etc. In one embodiment, one or more fillers are combined with silane coupling agents.

To further improve the physical strength of the cured compositions herein, reinforcing carbon black can be used as a main filler resulting in a black or darkly colored composition. Several commercial grades of carbon black useful in this invention are commercially available such as the Corax® products from Degussa. To obtain colorless translucent compositions, higher levels of fumed silica or precipitated silica can be used as the main filler to the exclusion of carbon black. The surface area of the filler can be more than 20 m$^2$/g.

Treated calcium carbonates having particle sizes from 0.07 microns to 4 microns are preferred fillers and are available under several trade names, such as: "Ultra Pflex®" and "Hi Pflex®" from Specialty Minerals; "Winnofil® SPM" and "Winnofil® SPT" from Zeneca Resins; "Hubercarb® 1 Qt", "Hubercarb® 3Qt" and "Hubercarb® W" from Huber and "Kotomite®" from ECC. These fillers can be used either alone or in combination.

The optional fillers can be incorporated in the moisture-curable resin composition in an amount of up to 80 weight percent, advantageously in an amount of up to 50 weight percent, and in certain embodiments, in an amount of from 20 weight percent to 50 weight percent based on the total weight of the composition.

The moisture-curable compositions herein can optionally include plasticizers. Exemplary plasticizers include phthalates, dipropylene and diethylene glycol dibenzoates and mixtures thereof, epoxidized soybean oil, and the like. Useful commercial dioctyl and diisodecyl phthalates include "Jayflex® DOP" and "Jayflex® DIDP" from Exxon Chemical. Dibenzoate plasticizers are available as "Benzoflex® 9-88", "Benzoflex® 50" and "Benzoflex® 400" from Velsicol Chemical Corporation. The optional plasticizer can represent up to 100 parts by weight per hundred parts of the moisture-curable silylated resin of Formula (I) with up to 40 parts by weight per hundred being preferred.

Useful optional thixotropes include various castor waxes, fumed silica, treated clays and polyamides. Commercially available thixotropes include, for example, Aerosil from Degussa, Cabo-Sil TS 720 from Cabot, Castorwax from CasChem, Thixatrol and Thixcin from Rheox, Crayvallac from Crayvalley Corp. and Dislon from King Industries.

The optional isocyanate-reactive scavenging agent is an agent possessing at least one active hydrogen and that reacts with isocyanate at a rate greater than that of undesired reactions that cause an increase in viscosity such as the further reaction of isocyanate with hydroxyl-terminated polymers (if there is still hydroxyl present), reaction of isocyanate with urethane to form allophanate, reaction of isocyanate with urea to form biuret and reaction of the hydroxyl-terminated polymers with an alkoxysilyl group.

The isocyanate-reactive scavenging agent can be added to the reaction mixture of isocyanatosilane, hydroxyl-terminated polymer and optionally other ingredients, such as catalysts and non-protic solvents, at a desired point at or near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polyurethane resin can come from the di- or polyisocyanate used to chain extend the polyol, or from the isocyanatosilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product. In one embodiment of the invention, the isocyanate-reactive scavenging agent is added to the reaction mixture at a viscosity range from 1,000 cP to 150,000 cP (measured at a temperature of 25° C.), and in another embodiment of the invention from 30,000 cP to 75,000 cP (measured at a temperature of 25° C.). In this manner, the isocyanate-reactive scavenging agent minimizes batch-to-batch variation of the final viscosity of the silylated polyurethane resin.

The isocyanate-reactive scavenging agent is allowed to react with the isocyanate-containing reaction mixture for sufficient time to ensure that all of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted and to inhibit the reaction of the residual hydroxyl groups of the hydroxyl-terminated polymer with the alkoxysilyl groups. In one embodiment of the invention, the amount of isocyanate-reactive scavenging agent added to the isocyanate-containing reaction mixture is from 0.01 to 5 weight percent based upon the weight of the moisture-curable silylated resin of Formula (I), and from 0.01 to 0.5 weight percent based upon the weight of the moisture-curable silylated resin in another embodiment of the invention, and in still another embodiment from 0.02 to 0.2 weight percent based upon the weight of the moisture-curable silylated resin.

According to one embodiment of the invention, the moisture-curable silylated resin of Formula (I) of reduced isocyanate content contains less than 0.1 weight percent isocyanate (measured as % NCO), and in another embodiment of the invention the moisture-curable silylated resin of reduced isocyanate content contains less than 0.02 weight percent isocyanate (measured as % NCO).

The isocyanate-reactive scavenging agent can be added neat or as a mixture with one or more other materials. The disappearance of the isocyanate can be determined directly by analytical techniques such as infra-red spectroscopy and titration, or indirectly by the measurement of constant viscosity of the reaction mixture. The synthesis can be monitored using titration (ASTM 2572-87) or infrared analysis. Silylation of the urethane polymers is considered complete when no residual —NCO can be detected by either technique.

According to one embodiment of the invention, the isocyanate-scavenging agent is a mono-alcohol or a mixture of different mono-alcohols, secondary amine or mercaptan.

Mono-alcohols are generally preferred in that they have low odor, do not contribute to the color of the silylated polyurethane resin and inhibit the reaction of residual hydroxyl-terminated polymer with alkoxysilyl groups. Other active hydrogen compounds such as amines and organic acids typically have strong odors, can impact color and can catalyze the reaction of the residual hydroxyl-terminated polymer with alkoxysilyl groups.

In one embodiment of the invention, the selected isocyanate-reactive scavenging agent is one that has little or no effect on the physical or cure properties of the resin or on the properties of an any cured material, for example, coating, sealant, adhesive, etc., made from the moisture-curable resin herein.

The monoalkanol isocyanate-reactive scavenging agent possesses the general formula: $R^{17}$—OH in which $R^{17}$ is a monovalent hydrocarbon radical containing from 1 to 30 carbon atoms and optionally may contain a heteroatom. The heteroatom can, for example, be oxygen, which can form organofunctional groups, such as ethers, ester, and ketone groups. In another embodiment, the hydrocarbon radical is selected from the group consisting of linear, branched and cyclic alkyl, and alkenyl, aryl, arenyl and aralkyl.

Representative non-limiting examples of $R^{17}$ include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethylphenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —$CH_2OH$. The mono-alcohol scavenging agents of the invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof.

In a specific embodiment of the invention, when the terminal alkoxysilyl group of the moisture-curable silylated resin of Formula (I) is a methoxysilyl the specific isocyanate-reactive scavenging agent is methanol. In another specific embodiment of the invention, when the terminal alkoxysilyl group of the moisture-curable silylated resin is an ethoxysilyl, the specific isocyanate-reactive scavenging agent is ethanol.

In one embodiment of the invention, the moisture-curable silylated resin of Formula (I) of reduced isocyanate content resulting from the addition of isocyanate-scavenging agent as disclosed herein, following aging, exhibits a viscosity of 1,000 cP to 150,000 cP, more specifically from 30,000 cP to 75,000 cP and most specifically from 35,000 cP to 65,000 cP.

Optional antioxidants that can be added to the moisture-curable composition of the invention to provide protection against oxidative change. The quantities in which antioxidants can be used vary within wide limits, for example, from 0.01 to 10 percent by weight and, more particularly, from 0.01 to 3 percent by weight, based on the weight of the moisture-curable silylated resin of Formula (I).

The composition of the invention can optionally include an adhesion promoter. Thus, for example, the adhesion promoter can be a compound of the general formula:

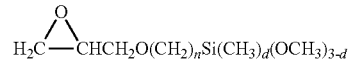

wherein d is 0, 1 or 2 and n is 2 to 6.

Preferred, non-limiting examples of adhesion promoters include trimethoxy-(3-oxiranylmethoxy-propyl)-silane and dimethoxy-methyl-(3-oxiranylmethoxy-propyl)-silane.

Water scavenger agent can optionally be added to the moisture-curable composition herein to improve its package stability and to prevent premature curing. It will be understood herein that any known or commercially used water scavenger agent can be employed herein. One type of water scavenger agent can be an alkoxysilane, for example, vinyltrimethoxysilane, methyltrimethoxysilane, and the like. The concentration of water scavenger agent can be in the range of from 0 to 5 percent by weight based on the weight of the moisture-curable silylated resin of Formula (I).

In an alternative to or in addition to optional water scavenging agent, desiccant can optionally be added to the moisture-curable composition herein to improve its package stability and to prevent premature curing. Any known or conventional desiccant, for example, silica gel, can be employed herein for such purposes.

As will be appreciated from the foregoing disclosure, the compositions of the invention can be prepared by combining: (a) a moisture-curable silylated resin of Formula (I), (b) a flexibilizer of Formula (II) and (c) a curing agent, as well as one or more of the previously described optional components, among others. The combination can be achieved by the use of static mixers or mechanical mixers.

When used as a coating, the moisture-curable composition of this invention can be applied to a desired substrate surface to protect it from weathering, impact, and exposure to corrosion and/or chemicals. Illustrative of substrates that can be treated using compositions of this invention include wood, plastic, concrete, vitreous surfaces, and metallic surfaces. The coating compositions of this invention are useful, for example, as a top coating disposed either directly onto the substrate surface itself or disposed onto a prior or other underlying coating, as for example, an inorganic or organic primer material, disposed on the substrate surface to achieve a desired purpose.

The coating compositions of this invention can be applied to a surface to be treated by conventional coating techniques such as, for example, dip coating, direct roll coating, reverse roll coating, curtain coating, spray coating, brush coating, and combinations thereof.

The moisture-curable composition herein is cured by exposure to moisture (water) at temperatures ranging from −10° C. to 100° C. at sub-atmospheric, atmospheric or supra-atmospheric pressures. Generally, moisture content in the air of from 15 to 100 percent relative humidity and more advantageously from 30 to 90 percent relative humidity provides acceptable cure times.

The cured resin composition of the invention exhibits high elongation and good tear strength compared to substantially the same cured composition lacking a flexibilizer. In one embodiment, the improvement in elongation is at least 10%, preferably at least 20%, and more preferably at least 30%. Improvement in tear strength is ordinarily at least 20%, preferably at least 40%, and more preferably at least 50% compared to substantially the same cured composition lacking a flexibilizer.

The cured resin composition of the invention is highly suitable for application as an adhesive, for example, a windshield adhesive, sealant, coating, gasket, addition to industrial rubber good, and the like.

Various features of the invention are illustrated by the examples presented below.

EXAMPLE 1

This example illustrates the preparation of a moisture-curable silylated resin of Formula (I) by the silylation of a hydroxyl-terminated polyurethane with an isocyanatosilane.

Into a four-neck reaction kettle was charged polypropylene glycol (1000 grams, 0.09 mole, weight average molecular weight of 12,000 grams per mole from Bayer under the trade name Acclaim® 12200 diol). The polyol was stirred and sparged with nitrogen gas at 60° C. for 16 hours. The temperature of the polyol was cooled to 45° C. and then isophorone diisocyanate (9.99 grams, 0.0495 mole from Bayer) and tin catalyst (dibutyltin dilaurate, 7.5 ppm Sn, from Chemtura under the trade name Fomrez® SUL-4) were added. After the exothermal had ceased, the reaction mixture was heated to 75° C. and maintained at this temperature with stirring and under a nitrogen gas blanket. The isocyanate content was checked every half hour using an n-butylamine titration method. When the isocyanate content was no longer detectable, 3-isocyanatopropyltrimethoxysilane (18.45 grams, 0.09 mole of Silquest® A-Link 35 from Momentive Performance Materials Inc.) was added and the reaction mixture was stirred at 75° C. until the isocyanate content was no longer detectable. The viscosity was approximately 60 Pas at 25° C.

EXAMPLE 2

This example illustrates the preparation of a moisture-curable silylated resin of Formula (I) by the silylation of a hydroxyl-terminated polyurethane with an isocyanatosilane.

Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35. mu.L), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene glycol)dimethyl ether). The mixture was reacted until the viscosity was 24,000 cP and the isocyanate concentration was 0.08%, at which point was added 3-isocyanatopropyltrimethoxysilane (Silquest® A-Link™ 35, 302.3 g, from Momentive Performance Materials, Inc.). Heating was continued until the reaction mixture reached viscosity 53,000 cP and isocyanate concentration 0.05%, when the heat was turned off and the reaction was allowed to cool slowly. When the reaction temperature dropped to 65° C. (123 minutes after turning off heat to the reactor) the viscosity was 63,000 cP and the isocyanate concentration was 0.04%, vinyltrimethoxysilane (Silquest A-171®, 302.2 g, from Momentive Performance Materials, Inc.) was added. At 55° C. (after a further 67 minutes) the viscosity was 50,000 cP and the isocyanate concentration was 0.04%, when the reaction was considered complete and the product was drained from the reactor. A peak for NCO was detected in the IR spectrum of the product.

EXAMPLE 3

This example illustrates the preparation of a moisture-curable silylated resin of Formula (I) by the silylation of a secondary amine-terminated polyurea (98 equivalent % urea linkages) with an isocyanatosilane.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 165.0 g ethyl acetate. A mixture of 9.4 g of isophorone diisocyanate and 1.7 g polyisocyanate Desmodur® Z-4470BA (NCO/NH=0.945) to introduce branching in the polyurea was added dropwise with agitation 26-30° C. Wt % NH determined per standard methodology was found to be 0.03 wt %. At this point, 1.2 g of 3-isocyanatopropyltrimethoxysilane was added and agitation continued at 45° C. for 2 hours to provide silylated polyurea. Titrations for NCO and NH were below detection limits. Solids were measured 39.8 wt % and viscosity 115 cps using a Brookfield HATDV-II, spindle 2 at 50 rpm.

EXAMPLE 4

This example illustrates the preparation of a moisture-curable silylated resin of Formula (I) by the silylation of a primary amine-terminated polyurea (98 equivalent % urea linkages) with an isocyanatosilane.

To a reactor provided with stirrer, nitrogen atmosphere and heater were introduced under agitation 25.0 g of primary amine-terminated polyoxytetramethylenediamine, Jefflink® XTJ-559, having an amine value of 1.39 meq/g, 31.9 g ethyl acetate and 31.9 g toluene. A mixture of 937 g of isophorone diisocyanate and 3.7 g toluene (NCO/NH=0.95) was added dropwise with agitation at 26-30° C. Wt % NH determined per standard methodology was found to be 0.03 wt %. At this point 0.4 g of 3-isocyanatopropyltrimethoxysilane was added and agitation continued at 45° C. overnight to provide silylated polyurea. Titrations for NCO and NH were below detection limits. Solids measured 31.0 wt % and viscosity 17500 cps using a Brookfield HATDV-II, spindle 2 at 50 rpm.

EXAMPLE 5

This example illustrates the preparation of a moisture-curable silylated resin of Formula (I) by the silylation of a secondary amine-terminated polyurea (99 equivalent % urea linkages) with an isocyanatosilane.

To a reactor provided with stirrer, nitrogen atmosphere and heater were introduced under agitation 50.0 g of secondary amine-terminated polyoxypropylenediamine, Jefflink® XTJ-585, having an amine value of 3.75 meq/g, and 109.0 g ethyl acetate. A mixture of 19.3 g of isophorone diisocyanate and 1.7 g polyisocyanate Desmodur® Z-4470BA (NCO/NH=0.975) was added dropwise with agitation at 26-30° C. Wt % NH determined per standard methodology was found to be 0.04 wt %. At this point 1.0 g of 3-isocyanatopropyltrimethoxysilane was added and agitation continued at 45° C. overnight to provide silylated polyurea. Titrations for NCO and NH were below detection limits. Solids measured 37.9 wt % and viscosity 150 cps using a Brookfield HATDV-II, spindle 2 at 50 rpm.

EXAMPLE 6

This example illustrates the preparation of a moisture-curable silylated resin of Formula (I) by the silylation of an isocyanate-terminated polyurea (98 equivalent % urea linkages) with an isocyanatosilane.

To a reactor provided with stirrer, nitrogen atmosphere and heater were introduced under agitation 18.0 g of isophorone diisocyanate and 72.1 g toluene. A mixture of 25.0 g of secondary amine-terminated polyoxypropylenediamine, Jefflink® XTJ-584, having an amine value of 5.8 meq/g, and 27.9 g toluene was added dropwise with agitation (NCO/NH=1.1). Wt % NCO determined per standard methodology was found to be 0.42 wt %. At this point, 3.1 g of N-ethylaminoisobutyltrimethoxysilane was added with agitation followed by heating at 45° C. for 1-2 hours to provided silylated polyurea. Titrations for NCO and NH were below detection limits. Solids measured 30.7 wt % and viscosity 1080 cps using a Brookfield HATDV-II, spindle 2 at 50 rpm.

EXAMPLE 7

This example illustrates the preparation of a moisture-curable silylated resin of Formula (I) by the silylation of a primary amine-terminated polyurea (100 equivalent % urea linkages) with an isocyanatosilane.

To a reactor provided with stirrer, nitrogen atmosphere and heater were introduced under agitation 10.0 g 1,7-diaminoheptane and 33.3 g dimethylformamide. A mixture of 8.6 g of isophorone diisocyanate and 20.0 g dimethylformamide was added dropwise with agitation (NCO/NH=0.5). Wt % NH determined per standard methodology was found to be 1.23 wt %. At this point, 15.8 g of 3-isocyanatopropyltrimethoxysilane was added with agitation and heated at 80° C. for 6 hours to provide silylated polyurea. Titrations for NCO and NH were below detection limits. Solids measured 30.2 wt % and viscosity 16 cps using a Brookfield HATDV-II, spindle 4 at 100 rpm.

EXAMPLE 8

This example illustrates the preparation of a moisture-curable silylated resin of Formula (I) by the silylation of an isocyanate-terminated polyurea (98 equivalent % urea linkages) with a secondary aminosilane.

To a reactor provided with stirrer, nitrogen atmosphere and heater were introduced 50.0 g of secondary amine-terminated polyoxypropylenediamine, Jefflink® XTJ-585, having an amine value of 3.75 meq/g, and 109.0 g ethyl acetate. A mixture of 19.3 g of isophorone diisocyanate and 1.7 g polyisocyanate Desmodur® Z-4470BA (NCO/NH=0.975) was added dropwise with agitation at 26-30° C. Wt % NH determined per standard methodology was found to be 0.04 wt %. At this point, 1.0 g of 3-isocyanatopropyltrimethoxysilane was added and agitation continued at 45° C. overnight to provide silylated polyurea. The wt % as Si(28) at 100 wt % solids was 0.18 wt %. Titrations for NCO and NH were below detection limits. Solids measured 37.9 wt % and viscosity 150 cps using a Brookfield HATDV-II, spindle 2 at 50 rpm. To the silylated polyurea was added 0.05 wt % 3-aminopropyltrimethoxysilane and 0.05 wt % 3-glycidoxypropyltrimethoxysilane.

EXAMPLE 9

This example illustrates the preparation of a moisture-curable silylated resin of Formula (I) by the silylation of a primary amine-terminated polyurea (97 equivalent % urea linkages) with an isocyanatosilane.

To a reactor provided with stirrer, nitrogen atmosphere and heater were introduced under agitation 25.0 g of primary amine-terminated polyoxytetramethylenediamine, Jefflink® XTJ-559 having an amine value of 1.39 meq/g, 31.9 g ethyl acetate and 31.9 g toluene. A mixture of 3.7 g of isophorone diisocyanate and 3.7 g toluene (NCO/NH=0.95) was added dropwise with agitation 26-30° C. Wt % NH determined per standard methodology was found to be 0.03 wt %. At this point, 0.4 g of 3-isocyanatopropyltrimethoxysilane was added and agitation continued at 45° C. overnight to provide silylated polyurea. Titrations for NCO and NH were below detection limits. Solids were determined to be 31.0 wt % and viscosity 17500 cps using a Brookfield HATDV-II, spindle 2 at 50 rpm. The wt % as Si (28) at 100 wt % solids was 0.18 wt %.

EXAMPLE 10

This example illustrates the preparation of a moisture-curable silylated resin of Formula (I) by the silylation of a primary amine-terminated polyurea (97 equivalent % urea linkages) with an isocyanatosilane.

To a reactor provided with stirrer, nitrogen atmosphere and heater were introduced under agitation 25.0 g of primary amine-terminated polyoxytetramethylenediamine, Jefflink® XTJ-559, having an amine value of 1.39 meq/g, 31.7 g ethyl acetate and 31.7 g toluene. A mixture of 3.5 g of isophorone diisocyanate and 3.5 g toluene (NCO/NH=0.89) was added dropwise with agitation at 26-30° C. Wt % NH determined per standard methodology was found to be 0.048 wt %. At this point, 0.6 g of 3-isocyanatopropyltrimethoxysilane was added and agitation continued at 45° C. overnight to provide silylated polyurea. Titrations for NCO and NH were below detection limits. Solids measured 29.8 wt % and viscosity 19200 cps using a Brookfield HATDV-II, spindle 2 at 50 rpm. The wt % as Si (28) at 100 wt % solids was 0.29 wt %.

EXAMPLE 11

This example illustrates the preparation of a moisture-curable silylated resin of Formula (I) by the silylation of a primary amine-terminated polyurea (97 equivalent % urea linkages) with an isocyanatosilane.

To a reactor provided stirrer, nitrogen atmosphere and heater were introduced under agitation 25.0 g of primary amine-terminated polyoxytetramethylenediamine, Jeffamine® ED-900 (XTJ-501), having an amine value of 2.13 meq/g and 51.2 g isopropanol. A mixture of 5.8 g of isophorone diisocyanate, 9.4 g ethyl acetate and 9.4 g toluene (NCO/NH=0.97) was added dropwise with agitation at 26-30° C. Wt % NH determined per standard methodology was found to be 0.016 wt %. At this point, 0.2 g of 3-isocyanatopropyltrimethoxysilane was added and agitation continued at 45° C. overnight to provide silylated polyurea. Titration for NCO and NH were below detection limits. Solids measured 31.0 wt % and viscosity 1380 cps using a Brookfield HATDV-II, spindle 2 at 50 rpm. The wt % as Si (28) at 100 wt % solids was 0.09 wt %.

EXAMPLE 12

This example illustrates the preparation of a moisture-curable silylated resin of Formula (I) by the silylation of a secondary amine-terminated polyurea (100 equivalent % urea linkages) with an isocyanatosilane.

To a reactor provided with stirrer, nitrogen atmosphere and heater were introduced under agitation added 80.0 g of secondary amine-terminated butadiene-acrylontitrile copolymer (Hycar 1300X45 ATBN®, Noveon), having an amine value of 0.56 meq/g, and 172.7 g butyl acetate. A mixture of 4.6 g isophorone diisocyanate and 14.9 g butyl acetate (NCO/NH=0.92) was added dropwise with agitation at room temperature. Temperature was increased to 70-80° C. for 2 hours after which the wt % NH determined per standard methodology was found to be 0.018 wt %. At this point, 0.7 g of 3-isocyanatopropyltrimethoxysilane was added and agitation continued at 45° C. overnight to provide silylated polyurea. Titration for NCO and NH were below detection limits. Solids were 27.9 wt % and viscosity 8320 cps measured with a Brookfield HATDV-II, spindle 4 at 50 rpm. The wt % as Si (28) at 100 wt % solids was 0.12 wt %.

EXAMPLE 13

This example illustrates the preparation of a moisture-curable silylated resin of Formula (I) by the silylation of an isocyanate-terminated polyurea (98 equivalent % urea linkages) with a secondary aminosilane.

To a reactor provided with stirrer, nitrogen atmosphere and heater were introduced under agitation 6.2 g of isophorone diisocyanate, 12.4 g ethyl acetate and 12.4 g toluene. A mixture of 25.0 g of amine terminated polyoxytetramethylenediamine, Jeffamine® ED-900 (XTJ-501), each amine being primary, with amine value of 2.13 meq/g, and 47.8 g isopropanol. (NCO/NH=1.03) was added dropwise with agitation at 26-30° C. Wt % NH determined per standard methodology was found to be 0.017 wt %. At this point, 0.25 g of N-ethyl aminoisobutyltrimethoxysilane was added and agitation continued at 45° C. overnight to provide silylated polyurea. Titration for NCO and NH were below detection limits. Solids measured 29.4 wt % and viscosity 890 cps using a Brookfield HATDV-II, spindle 2 at 50 rpm. The wt % as Si (28) at 100 wt % solids was 0.11 wt %.

EXAMPLE 14

This example illustrates the preparation of a moisture-curable silylated resin of Formula (I) by the silylation of a secondary amine-terminated polyurea (98 equivalent % urea linkages) with an epoxysilane.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 112.2 g butyl acetate. A mixture of 10.6 g of isophorone diisocyanate and 10.6 g butyl acetate (NCO/NH=0.98) was added dropwise with agitation at 26-30° C. and a 500 rpm agitation rate. Wt % NH determined per standard methodology was found to be 0.059 wt %. At this point, 2.7 g of gamma-glycidoxypropyltrimethoxysilane was added and agitation continued at 45° C. for 2 hours to provide silylated polyurea. Titrations for NCO and NH were below detection limits. Solids measured 61.4 wt % and viscosity 544 cps using a Brookfield HATDV-II, spindle 3 at 50 rpm.

EXAMPLE 15

This example illustrates the preparation of a moisture-curable silylated resin of Formula (I) by the silylation of a secondary amine-terminated polyurea (98 equivalent % urea linkages) with methacryloxysilane.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 112.2 g butyl acetate. A mixture of 9.9 g of isophorone diisocyanate and 9.9 g butyl acetate (NCO/NH=0.97) was added dropwise with agitation at 26-30° C. and a 500 rpm agitation rate. Wt % NH determined per standard methodology was found to be 0.061 wt %. At this point, 2.4 g of methacryloxypropyltrimethoxysilane was added and agitation continued at 45° C. for 2 hours to provide silylated polyurea. Titrations for NCO and NH were below detection limits. Solids measured 61.4 wt % and viscosity 544 cps using a Brookfield HATDV-II, spindle 3 at 50 rpm.

EXAMPLE 16

This example illustrates the preparation of a moisture-curable silylated resin of Formula (I) by the silylation of a secondary amine-terminated polyurea (100 equivalent % urea linkages) with an isocyanatosilane.

To a reactor provided with stirrer and heater was introduced under agitation 75.0 g of amine terminated polyoxytetramethylenediamine, Jeffamine® ED-2001 (XTJ-576), each amine being secondary, with amine value of 0.91 meq/g, then heated at 100° C. under vacuum to dryness, cooled to 31° C. and vacuum released with nitrogen. Agitation was increased to 500 rpm and 6.5 g of isophorone diisocyanate (NCO/NH=0.845) was added. An exotherm from 31 to 39° C. was observed after which the reactor was heated to 50-60° C. for 1 hour. Wt % NH determined per standard methodology was found to be 0.047 wt %. At this point, 0.5 g of 3-isocyanatopropyltrimethoxysilane was added and agitation continued providing silylated polyurea. After the addition of 0.1 g methanol and 1.6 g vinyltrimethoxysilane, cooling was applied. Titration for NCO and NH were below detection limits. Viscosity was 40.500 cps. The wt % as Si (28) was 0.09 wt %.

EXAMPLE 17

This example illustrates the preparation of a moisture-curable silylated resin of Formula (I) by the silylation of a secondary amine-terminated polyurea (100 equivalent % urea linkages) with an isocyanatosilane.

To a reactor provided with stirrer and heater were introduced under agitation 75.0 g of amine terminated polyoxytetramethylenediamine, Jeffamine® ED-2001 (XTJ-576), each amine being secondary, with amine value of 0.91 meq/g, 22.7 g butyl acetate and 32.6 g ethyl acetate. Agitation was increased to 200 rpm and a solution of 6.5 g of isophorone diisocyanate, 2.35 g polyisocyanate Desmodur® Z-4470BA and 28.5 g toluene (NCO/NH=0.945) was added. An exotherm from 26 to 30° C. was observed after which the vessel was heated to 45° C. for 1 hour. Wt % NH determined per standard methodology was found to be 0.03 wt %. At this point, 0.7 g of 3-isocyanatopropyltrimethoxysilane was added and agitation continued to provide silylated polyurea. Titration for NCO and NH were below detection limits. Viscosity was 368 cps and solids 52.6%. The wt % as Si (28) was 0.11 wt %.

EXAMPLE 18

This example illustrates the preparation of a moisture-curable silylated resin of Formula (I) by the silylation of an amine-terminated polyurea obtained from a mixture of secondary diamine and primary triamine (100 equivalent % urea linkages) with an isocyanatosilane.

To a reactor provided stirrer and heater were introduced under agitation 75.0 g of amine-terminated polyoxytetramethylenediamine, Jeffamine® ED-2001 (XTJ-576), each amine being secondary, with amine value of 0.91 meq/g, 9.8 g of amine-terminated polyoxytetramethylenetriamine, Jeffamine® T-3000 (XTJ-509), each amine being primary, with amine value of 0.97 meq/g, 23.2 g butyl acetate and 43.4 g ethyl acetate. Agitation was increased to 200 rpm and 8.1 g of isophorone diisocyanate in 26.2 g toluene (NCO/NH=0.93) was added dropwise. An exotherm from 26 to 30° C. was observed after which the reactor was heated to 45° C. for 1 hour. Wt % NH determined per standard methodology was found to be 0.023 wt %. At this point, 0.6 g of 3-isocyanatopropyltrimethoxysilane was added and agitation continued to provide silylated polyurea. Titration for NCO and NH were below detection limits. Solids content was 51.9% and viscosity 1070 cps. Viscosity at 100% solids measured 117,000 cps using a Brookfield DV-II+Pro. The wt % as Si (28) was 0.08 wt %.

EXAMPLE 19

This example illustrates the preparation of a moisture-curable silylated polyurethane resin (100 equivalent percent of urethane linkages).

To a reactor provided with stirrer and heater was introduced under agitation 200.0 g of polypropylene oxide diol, Acclaim® 8200, with hydroxyl number (OH#) of 14. Agitation was increased to 200 rpm, the diol was dried under vacuum at 100° C., thereafter cooled to 65° C. and the vacuum released using nitrogen. To the diol was added 0.006 g dibutyltin dilaurate and 2.8 g of isophorone diisocyanate (NCO/OH=0.5). Heating was continued until wt % NCO determined per standard methodology was less than 0.02 wt %. At this point, 5.1 g of 3-isocyanatopropyltrimethoxysilane was added and agitation continued until wt % NCO titration was below 0.01 wt %. Viscosity of the resulting silylated polyurethane resin was 55,000 cps. and the wt % as Si (28) was 0.33 wt %.

EXAMPLE 20

This example illustrates the preparation of a silylated polyurethane-polyurea resin (58 equivalent % urea linkages, 42 equivalent % urethane linkages).

To a reactor provided with stirrer and heater were introduced under agitation 168.8 g of polypropylene oxide diol, Acclaim® 12200 with hydroxyl number (OH#) of 10, and 76.5 g of amine-terminated polyoxytetramethylenediamine, Jeffamine® ED-2001 (XTJ-576), each amine being secondary, with amine value of 0.91 meq/g. Agitation was increased to 200 rpm, the diol dried under vacuum at 100° C., thereafter cooled to 60° C. and the vacuum released using nitrogen. Agitation was increased to 700 rpm followed by the addition of 8.6 g of isophorone diisocyanate (NCO/NH+OH=0.84). To this mixture was added 0.2 g of a 1 wt % toluene solution of dimethylbis[(1-oxoneodecyl)oxy]stannane and heating was continued until NCO determined per standard methodology was no longer detected. At this point, 3.0 g of 3-isocyanatopropyltrimethoxysilane was added and agitation continued until titration indicated the absence of detectable NCO. Viscosity of the resulting silylated polyurethane-polyurea product was 263,000 cps. and the wt % as Si (28) was 0.17 wt %.

EXAMPLE 21

This example illustrates the preparation of a moisture-curable silylated resin of Formula (I) by the silylation of an isocyanate-terminated polyurethane derived from hydroxyl-terminated polybutadiene and a diisocyanate with an aminosilane.

To a reaction vessel equipped with mixing capability, condenser, nitrogen atmosphere and heating was added 250.0 g of hydroxyl-terminated polybutadiene Poly Bd® R-20LM resin (SpecialChem) possessing a hydroxyl number of 101. This resin was dried using a nitrogen purge at 85° C. overnight. The resin was cooled to 65° C. followed by addition of 0.21 g of a 10 wt % solution of dibutyltin dilaurate and agitation for 30 minutes. Next, 75.2 g of isophorone diisocyanate (IPDI) was added drop wise over a two-minute period with agitation. An exotherm to 88° C. was observed and the temperature was reduced to, and held at, 72-75° C. for 45 minutes. The wt % NCO was determined by standard methodology and found to be 2.74 wt %. At this point, 49.7 g of N-ethylamino isobutyltrimethoxysilane was added and agitation continued at temperature for 1 hour followed by cooling to room temperature.

EXAMPLE 22

This example illustrates the preparation of a moisture-curable silylated resin of Formula (I) by the silylation of an isocyanate-terminated polyurethane derived from hydroxyl-terminated polybutadiene and a diisocyanate with an aminosilane.

To a reaction vessel equipped with mixing capability, condenser, nitrogen atmosphere and heating was added 120.0 g of hydroxyl-terminated polybutadiene Poly Bd® R-45M (SpecialChem) resin possessing a hydroxyl number of 40.4 and 120.0 g of a polypropylene polyol Acclaim® 4200 (SpecialChem) possessing a hydroxyl number of 28. The polyols were dried to reduce their moisture level. To this mixture was added 24.5 g of isophorone diisocyanate followed by heating for 2 hours at approximately 80° C. which was then decreased to 70-75° C. for 3 hours at which point 0.2 g of a 10 wt % solution of dibutyltin dilaurate was added and the temperature maintained for 1 hour. The wt % NCO was determined to be 0.8 wt %. At this point, 24.5 g of N-ethylaminoisobutyltrimethoxysilane was added and agitation continued while cooling to room temperature.

EXAMPLE 23

This example illustrates the preparation of a moisture-curable silylated resin of Formula (I) by the silylation of an isocyanate-terminated polyurethane derived from hydroxyl-terminated polybutadiene and a diisocyanate with an aminosilane.

To a reaction vessel equipped with mixing capability, condenser, nitrogen atmosphere and heating was added 200.0 g hydroxyl-terminated polybutadiene Krasol® LBHP2000 (Sartomer) resin possessing a hydroxyl number of 46 and 200.0 g toluene which was then refluxed to reduce moisture level. To this was added 35.9 g of isophorone diisocyanate after cooling to 85° C. Temperature was maintained at 85-95° C. for 3 hours at which point 0.1 g of a 10 wt % solution of dibutyltin dilaurate was added and continued at temperature for 1 hour. The wt % NCO was determined to be 2.4 wt %. At this point, 32.4 g of N-ethylaminoisobutyltrimethoxysilane was added and agitation continued while cooling to room temperature.

EXAMPLE 24

This example illustrates the preparation of a moisture-curable silylated resin of Formula (I) by the silylation of a hydroxyl-terminated polyurethane derived from a hydroxyl-terminated polybutadiene and a diisocyanate with an isocyanatosilane.

To a reaction vessel equipped with mixing capability, condenser, nitrogen atmosphere and heating was added 100.0 g hydroxyl-terminated polybutadiene Krasol® HLBHP3000 (Sartomer) resin possessing a hydroxyl number of 31 and 85.0 g polycaprolactone polyol Capa® 2302A possessing a hydroxyl number of 38 followed by heating at 100-110° C. to reduce moisture level. To this mixture was added 8.4 g of isophorone diisocyanate after cooling to 80° C. The temperature was maintained at 80-95° C. for 3 hours at which point 0.4 g of a 10 wt % solution of 2,2'-dimorpholinediethyl-ether was added and continued at temperature for 3 hours. The temperature was reduced to 65° C. and 8.0 g 3-isocyanatopropyltrimethoxysilane was added and further heated at 70-80° C. for 4 hours.

EXAMPLE 25

This example illustrates the preparation of a moisture-curable silylated resin of Formula (I) by the silylation of an isocyanate-terminated polyurethane derived from a hydroxyl-terminated polybutadiene and a diisocyanate with an aminosilane.

To a reaction vessel equipped with mixing capability, condenser, nitrogen atmosphere and heating was added 100.0 g a,a,a-trifluorotoluene, 100.0 g hydroxyl-terminated polybutadiene Poly Bd® LF3 resin possessing a hydroxyl number of 49.4 and 37.0 g $HOCH_2CH_2(CF_2)_{-10}CF_3$ Zonyl® BA-LD (DuPont) possessing a hydroxyl number of 92 which was then heated to reduce moisture level. To this mixture was added 27.7 g of isophorone diisocyanate followed by the addition of 0.1 g of a 10 wt % solution of dibutyltin dilaurate with the temperature being maintained at 65-75° C. for 3 hours. The wt % NCO was determined to be 1.3 wt %. At this point, 17.6 g of N-ethylaminoisobutyltrimethoxysilane was added and agitation continued while cooling to room temperature.

EXAMPLE 26

This example illustrates the preparation of a moisture-curable silylated resin of Formula (I) by the silylation of an isocyanate-terminated polyurethane derived from a hydroxyl-terminated polybutadiene and a diisocyanate with an aminosilane.

To a reaction vessel equipped with mixing capability, condenser, nitrogen atmosphere and heating was added 100.0 g a,a,a-trifluorotoluene, 100.0 g hydroxyl-terminated polybutadiene Poly Bd® R45HTLO (SpecialChem) resin possessing a hydroxyl number of 45.4 and 18.4 g $HOCH_2CH_2(CF_2)_{-10}CF_3$ Zonyl® BA-LD (DuPont) possessing a hydroxyl number of 92 followed by heating to reduce moisture level. To this mixture was added 22.0 g of isophorone diisocyanate followed by addition of 0.1 g of a 10 wt % solution of dibutyltin dilaurate, the temperature being maintained at 65-75° C. for 3 hours. The wt % NCO was determined to be 0.7 wt %. At this point, 13.3 g of N-ethylaminoisobutyltrimethoxysilane was added and agitation continued while cooling to room temperature.

EXAMPLE 27

This example illustrates the preparation of a moisture-curable silylated resin of Formula (I) containing (1) a silylated non-acrylic polymer obtained from the reaction of polyol with isocyanatosilane, and (2) silylated acrylic polymer obtained from the reaction of hydroxyl-terminated acrylate polymer with an isocyanatosilane.

The silylated non-acrylic polymer was prepared by charging Acclaim® 8200 (400 grams, 0.05 mole, available from Bayer) and having Mn of 8000 and OH no. of 14) to a resin kettle and with agitation, sparging with nitrogen at 80° C. until the moisture content reduced to 200 ppm or less. The temperature of the kettle was then cooled down to 45±5° C. upon the addition of IPDI (5.60 grams, 0.025 mole, available from Bayer). The catalyst, Fomrez® SUL-4, (7 ppm, available from Chemtura Co.) was added 5 minutes later. The mixture was then heated to 75° C. and was maintained at 75±2° C. while stirring under a nitrogen blanket, for the condensation reaction. The NCO content was checked using the n-dibutylamine titration method and was monitored approximately every 0.5 hrs. After reaching the theoretically capping position, 3-isocyanatopropyltrimethoxysilane, Silquest® A-Link 35 (10.26 grams, 0.05 mole, available from Momentive Performance Materials, Inc.), was added in, the reactions proceeded at the same temperature until completion, as determined by titration. The resulted silylated non-acrylic polymer had viscosity of 45,000 cP at 25° C.

In a three-neck reaction kettle, hydroxyl containing acrylic polymer, G-Cure 114LB80, (200 grams, 0.21 mole of equivalent OH group, available from Cognis) and 3-isocyanatopropyltriethoxysilane, Silquest® A-Link 25 (52.06 grams, 0.21 mol, available from Momentive Performance Materials, Inc.) were charged and the temperature raised to 60° C. was and maintained for four hours under a nitrogen blanked. The finished product was free of any detectable isocyanate (—NCO) by titration and had a viscosity of 62,300 cP at 25° C.

The silylated non-acrylic polymer (80 grams) and the silylated acrylate polymer (20 grams) were mixed in a Speed Mixer for two minutes. The mixture was a clear liquid having viscosity of 51,000 cP. One percent of Formrez® UL11(A) (available from Chemtura Co.) was added and mixed for another minute.

EXAMPLE 28

This example illustrates the preparation of a moisture-curable silylated resin of Formula (I) by the silylation of an isocyanate-terminated polyurethane derived from a hydroxyl-terminated polytetrahydrofuran and a diisocyanate with an aminosilane.

A moisture-curable silylated resin was prepared by charging Acclaim 4200 (280 grams, 0.07 mole), a low unsaturation poly(oxypropylene) diol having a number average molecular weight of 4,000 grams/mole and a hydroxyl number of 27.9 (Bayer), and PolyTHF Polyether (120 grams, 0.06 mole) a polytetrahydrofuran having a number average molecular weight of 2,000 grams/mole and a hydroxyl number of 55.4 (BASF) to a resin kettle and with agitation, sparging with nitrogen at 80° C. until the moisture content was reduced to 200 ppm or less. The temperature of the kettle was then cooled to 45±5° C. upon the addition of 4,4'-diphenyl methane diisocyanate, Mondur® M (45.1 grams, 0.18 mole; Bayer). The catalyst, dibutyltindilaurate, Fomrez® SUL-4 (5.5 ppm based upon tin; Chemtura Co.), was added 5 minutes later. The mixture was then heated to, and maintained at, 75±5° C. while stirring under a nitrogen blanket for the condensation reaction. The NCO content was measured using the n-dibutylamine titration method and monitored approximately every 0.5 hrs. After reaching an NCO content of 0.97 percent, N-ethyl-3-amino-2-methylpropyltrimethoxysilane, Silquest® A-Link 15 (24.36 grams, 0.11 mole; Momentive Performance Materials, Inc.) was added and the reaction continued at the same temperature until completion as determined by titration.

EXAMPLE 29

This example illustrates the preparation of a flexibilizer of Formula (II) designated Flexibilizer A.

Water (600 g) was heated to 85° C. in a 2 L, 3-necked flask equipped with a reflex condenser, stirrer, addition funnel and a heating mantle. With the stirrer running, a pre-mixed solution of 150 g $Me_2SiCl_2$, 50 g $Ph_2SiCl$, and 90 g toluene was slowly added to the flask. The temperature of the reaction mixture in the flask was maintained between 75 and 90° C. during addition. The reaction mixture was heated and mixed for an additional hour at 85° C. Stirring was then discontinued and the reaction mixture allowed to phase separate. The aqueous phase was drained, and 200 g of water were added to the organic phase which was then heated to 85° C. with stirring. The reaction mixture was heated and mixed for an additional hour at 85° C. Stirring was then discontinued and the reaction mixture allowed to phase separate. The aqueous phase was drained, and another 200 g of water were added to the organic phase which was then heated to 85° C. with stirring. The reaction mixture was heated and mixed for an additional hour at 85° C. Stirring was then discontinued and the reaction mixture allowed to phase separate. The aqueous phase was drained. The organic phase was stripped for 1 hour at 120° C. under 50 mm Hg pressure. The stripped organic phase was collected as Flexibilizer A, which has the structure HO—Si$(CH_3)_2$—O—[Si$(CH_3)_2$O]$_m$—[Si$(Ph)_2$O]$_n$—Si$(CH_3)_2$—OH where m/n is 4.42.

EXAMPLES 30 AND 31 AND COMPARATIVE EXAMPLE 1

Examples 30 and 31 and Comparative Example 1 were prepared by combining all ingredients, for example, in an extruder. The components and the amounts of each component are presented in Table 1.

TABLE 1

| | Example 30 wt % | Example 31 wt % | Comparative Example 1 wt % |
|---|---|---|---|
| Moisture-curable Silylated Resin of Example 1 | 54.24% | 57.03% | 72.08% |
| Flexibilizer A[1] | 18.08% | 15.05% | — |
| Water scavenger agent[2] | 0.38% | 0.40% | 0.40% |
| Antioxidant[3] | 0.15% | 0.16% | 0.16% |
| Antioxidant[4] | 0.15% | 0.16% | 0.16% |
| Filler[5] | 25.61% | 25.74% | 25.74% |
| Adhesion promoter[6] | 0.23% | 0.24% | 0.24% |
| Adhesion promoter[7] | 1.05% | 1.11% | 1.11% |
| Catalyst[8] | 0.11% | 0.11% | 0.11% |
| Total | 100.00% | 100.00% | 100.00% |

[1]Flexibilizer A, the preparation of which is illustrated in Example 29, is available from Momentive Performance Materials Inc.
[2]Trimethoxy-vinyl-silane from Momentive Performance Materials Inc. under the trade name Silquest ® A-171 silane.
[3]Butanedioic acid, polymer with 1-(2-hydroxyethyl)-2,2,6,6-tetramethylpiperidin-4-ol from BASF Corporation under the trade name Tinuvin ™ 622.
[4]Reaction products of methyl 3-(3-(2H-benzotriazole-2-yl)-5-t-butyl-4-hydroxyphenyl) propionate from BASF Corporation under the trade name Tinuvin ™ 213.
[5]Carbon black from Cabot Inc. under trade name Elftex ® 8.
[6]Trimethoxy-(3-oxiranylmethoxy-propyl)-silane from Momentive Performance Materials Inc. under the trade name Silquest ® A-187 silane.
[7]N(beta-aminoethyl) gamma-aminopropyltrimethoxy-silane from Momentive Performance Materials Inc. under the trade name Silquest ® A-1120 silane.
[8]Tin catalyst from Momentive Performance Materials Inc. under the trade name Fomrez ® Catalyst SUL-4.

The test results for Examples 30 and 31 and Comparative Example 1 are present in Table 2.

TABLE 2

| | Example 30 | Example 31 | Comparative Example 1 |
|---|---|---|---|
| Shore A | 37 | 43 | 57 |
| Tensile strength, psi | 813 | 944 | 915 |
| Modulus/100% E, psi | 182 | 224 | 409 |
| Elongation, % | 394 | 385 | 226 |
| Tear (B) strength, lbf/in | 193 | 219 | 104 |
| Lap Shear Cold Rolled Steel | | | |
| Shear Strength, psi | 278 | 307 | 295 |
| Cohesive Failure, % glass | 0 | 0 | 0 |
| Shear Strength, psi | >660 | 660 | 639 |
| Cohesive Failure, % e-coated steel | Substrate failure | 100 | 100 |
| Shear Strength, psi | 990 | 949 | 864 |
| Cohesive Failure, % | 100 | 100 | 100 |

Examples 30 and 31, containing 18% and 15% of Flexibilizer A, respectively, exhibit higher elongation and tear strength than Comparative Example 1, which does not contain Flexibilizer A.

EXAMPLES 32 AND 33 AND COMPARATIVE EXAMPLE 2

Examples 32 and 33 and Comparative Example 2 were prepared using the procedure of Example 30. The components, the amounts of each component and test results are presented in Table 3.

TABLE 3

|  | Example 32 wt % | Example 33 wt % | Comparative Example 2 wt % |
|---|---|---|---|
| Moisture-curable Silylated Resin of Example 1 | 89.76% | 89.14% | 99.58% |
| Flexibilizer A | 9.82% | 9.75% | — |
| Water scavenger agent[9] | — | 0.70% | — |
| Catalyst[10] | 0.42% | 0.42% | 0.42% |
| Total | 100.0% | 100.0% | 100.0% |
| Shore A | 11 | 11 | 17 |
| Tensile strength, psi | 79 | 75 | 85 |
| Modulus/100% E, psi | 47 | 51 | 68 |
| Elongation, % | 240 | 208 | 166 |

[9]Trimethoxy-vinyl-silane from Momentive Performance Materials Inc. under the trade name Silquest ™ A-171 silane.
[10]Tin catalyst from Momentive Performance Materials Inc. under the trade name Fomrez ™ Catalyst SUL-4.

EXAMPLES 34-36 AND COMPARATIVE EXAMPLES 3 AND 4

Examples 34-36 and Comparative Examples 3 and 4 were prepared using the procedure of Example 30. The components, the amounts of each component and test results are presented in Table 4.

TABLE 4

|  | Ex. 34 | Ex. 35 | Ex. 36 | Comparative Example 3 | Comparative Example 4 |
|---|---|---|---|---|---|
| Moisture-curable Silylated Resin of Example 1 | 53.64% | 53.64% | 53.64% | 71.51% | 53.64% |
| Flexibilizer A | 17.88% | — | — | — | — |
| Flexibilizer B[11] | — | 17.88% | — | — | — |
| Additive[12] | — | — | 17.88% | — | — |
| Plasticizer[13] | — | — | — | — | 17.88% |
| Water scavenger agent[14] | 1.49% | 1.49% | 1.49% | 1.49% | 1.49% |
| Antioxidant[15] | 0.15% | 0.15% | 0.15% | 0.15% | 0.15% |
| Antioxidant[16] | 0.15% | 0.15% | 0.15% | 0.15% | 0.15% |
| Filler[17] | 25.33% | 25.33% | 25.33% | 25.33% | 25.33% |
| Adhesion promoter[18] | 0.22% | 0.22% | 0.22% | 0.22% | 0.22% |
| Adhesion promoter[19] | 1.04% | 1.04% | 1.04% | 1.04% | 1.04% |
| Catalyst[20] | 0.10% | 0.10% | 0.10% | 0.10% | 0.10% |
| Total | 100.00% | 100.00% | 100.00% | 100.00% | 100.00% |
| Shore A | 34 | 43 | Did not cure in 3 days | 58 | 47 |
| Tensile strength, psi | 922 | 842 |  | 962 | 710 |
| Modulus/100% E, psi | 233 | 221 |  | 418 | 318 |
| Elongation, % | 358 | 405 |  | 242 | 226 |
| Tear (B) strength, lbf/in | 201 | 224 |  | 121 | 80 |

[11]Flexibilizer B has the structure $CH_3O—Si(CH_3)_2—O—[Si(CH_3)_2O]_n—[Si(Ph)_2O]_n—Si(CH_3)_2—OCH_3$, and is available from Momentive Performance Materials Inc.
[12]Hydroxyl-terminated polydimethylsiloxane from Momentive Performance Materials Inc. under the trade name SE 4026.
[13]Di-isododecyl phthalate plasticizer from Exxon Chemical under the trade name DIDP.
[14]Trimethoxy-vinyl-silane from Momentive Performance Materials Inc. under the trade name Silquest ™ A-171 silane.
[15]Butanedioic acid, polymer with 1-(2-hydroxylethyl)-2,2,6,6-tetramethylpiperidin-4-ol from BASF Corporation under the trade name Tinuvin ™ 622.
[16]Reaction products of methyl 3-(3-(2H-benzotriazole-2-yl)-5-t-butyl-4-hydroxyphenyl) propionate from BASF Corporation under the trade name Tinuvin ™ 213.
[17]Carbon black from Cabot Inc. under trade name Elftex ® 8.
[18]Trimethoxy-(3-oxiranylmethoxy-propyl)-silane from Momentive Performance Materials Inc. under the trade name Silquest ™ A-187 silane.
[19]N(beta-aminoethyl) gamma-aminopropyltrimethoxy-silane from Momentive Performance Materials Inc. under the trade name Silquest ™ A-1120 silane.
[20]Tin catalyst from Momentive Performance Materials Inc. under the trade name Fomrez ™ Catalyst SUL-4.

In an isopropyl alcohol (IPA) extraction, 8-10 g of cured Examples 34-36 and Comparative Examples 3 and 4 were immersed in 1000 g of IPA. After one day the IPA was discarded and replaced with fresh IPA. After three days of immersion, the cured samples were removed from IPA, padded dry with paper towel, and baked at 50° C. for four hours. The weight loss was measured, and the results are shown in Table 5.

TABLE 5

|  | Ex. 34 | Ex. 35 | Ex. 36 | Comparative Example 3 | Comparative Example 4 |
|---|---|---|---|---|---|
| Weight Loss after IPA extraction of cured samples | 5.90% | 17.70% | No data | 0.00% | 19.40% |

EXAMPLES 37-43

These examples illustrate additional moisture-curable compositions in accordance with the invention (all amounts in wt %).

| Component | Moisture-curable Composition | | | | | | |
|---|---|---|---|---|---|---|---|
| | Ex. 37 | Ex. 38 | Ex. 39 | Ex. 40 | Ex. 41 | Ex. 42 | Ex. 43 |
| Moisture-curable Silylated Resin | Ex. 1 | Ex. 3 | Ex. 6 | Ex. 19 | Ex. 21 | Ex. 27 | Ex. 28 |
| | 60.0 | 38.0 | 50.0 | 50.0 | 60.0 | 40.0 | 40.0 |
| Flexibilizer A | 8.0 | — | 6.0 | 5.0 | 7.0 | — | 5.0 |
| Flexibilizer B | — | 10.0 | — | — | — | 8.0 | — |
| Catalyst[20] | 0.1 | — | — | — | 0.1 | — | 0.1 |
| Catalyst[21] | — | 0.1 | — | — | — | 0.1 | — |
| Catalyst[22] | — | — | 0.2 | — | — | — | — |
| Catalyst[23] | — | — | — | 0.2 | — | — | — |
| Adhesion promoter[24] | 0.9 | 1.0 | 0.6 | 1.0 | 1.0 | 1.0 | 0.4 |
| Adhesion promoter[25] | — | 0.3 | — | — | 0.2 | — | — |
| Water scavenger agent[26] | 0.5 | 0.5 | 0.5 | 0.5 | 0.7 | 0.4 | 1.0 |
| Filler[27] | 8.0 | — | — | 10.0 | 5.0 | — | 10.0 |
| Filler[28] | 22.1 | 23.0 | — | — | — | — | — |
| Filler[29] | — | 20.0 | — | — | — | — | — |
| Filler[30] | — | — | 14.5 | 7.4 | — | 20.0 | 10.0 |
| Filler[31] | — | — | 18.0 | 10.0 | 19.6 | 20.0 | 12.0 |
| Antioxidant[32] | 0.2 | — | 0.2 | 0.2 | 0.2 | — | 0.5 |
| Antioxidant[33] | — | 0.2 | — | 0.2 | 0.2 | — | 0.5 |
| Pigment[34] | 0.2 | — | — | — | — | — | — |
| Thixotrope[35] | — | 1.0 | — | — | — | — | — |
| Thixotrope[36] | — | — | — | — | — | 0.5 | 0.5 |
| Plasticizer[37] | — | 5.9 | 10.0 | 14.5 | 5.0 | 10.0 | 20.0 |
| Additive[38] | — | — | — | 1.0 | — | — | — |
| Additive[39] | — | — | — | — | 1.0 | — | — |
| Total Weight | 100.0 | 100.0 | 100.0 | 100.0 | 100.0 | 100.0 | 100.0 |

[20]Tin catalyst from Momentive Performance Materials Inc. under the trade name Fomrez ® Catalyst SUL-4.
[21]Dibutyltine ketonate from Reaxis under the trade name Reaxis ™ C226.
[22]Dibutyl tin oxide in dialkyl phthalate from Momentive Performance Materials Inc. under the trade name Fomrez ® Catalyst SUL-11B.
[23]Amino-functional oligosiloxane from Momentive Performance Materials Inc. under the trade name VX 225.
[24]N(beta-aminoethyl) gamma-aminopropyltrimethoxy-silane from Momentive Performance Materials Inc. under the trade name Silquest ® A-1120 silane.
[25]Trimethoxy-(3-oxiranylmethoxy-propyl)-silane from Momentive Performance Materials Inc. under the trade name Silquest ™ A-187 silane.
[26]Trimethoxy-vinyl-silane from Momentive Performance Materials Inc. under the trade name Silquest ® A-171 silane.
[27]Carbon black from Cabot Inc. under trade name Elftex ® 8.
[28]Surface treated ground calcium carbonate from Omya AG under the trade name Omyabond ™ 520.
[29]Surface treated ground calcium carbonate from Omya AG under the trade name Omyacarb ™ 5FT.
[30]Ultrafine coated precipitated calcium carbonate from Specialty Minerals, Inc. under the trade name Ultra Pflex ™.
[31]Surface treated ground calcium carbonate from Specialty Minerals, Inc. under the trade name HiPflex ™.
[32]Reaction products of methyl 3-(3-(2H-benzotriazole-2-yl)-5-t-butyl-4-hydroxyphenyl) propionate from BASF Corporation under the trade name Tinuvin ™ 213.
[33]Butanedioic acid, polymer with 1-(2-hydroxylethyl)-2,2,6,6-tetramethylpiperidin-4-ol from BASF Corporation under the trade name Tinuvin ™ 622.
[34]Rutile titanium dioxide pigment from E. I. DuPont de Nemours and Company under the trade name Ti-Pure ® R-960.
[35]Surface modified fumed silica from Cabot Corporation under the trade name Cabosil ™ TS 720.
[36]Polyamide wax from Cray Valley Ltd. under the trade name Crayvallac ™ SLX.
[37]Di-isododecyl phthalate plasticizer from Exxon Chemical under the trade name DIDP.
[38]Hydroxyl-terminated polydimethylsiloxane from Momentive Performance Materials Inc. under the trade name SE 4026.
[39]Dipropylene glycol from Sigma-Aldrich Company under the trade name D215554.

These examples are to be construed as exemplary in nature only and are not intended in any way to limit the appended claims. It is contemplated that a person having ordinary skill in the art would be able to produce obvious variations of the subject matter and disclosures herein contained that would be by reason of such ordinary skill within the literal or equitable scope of the appended claims.

What is claimed is:

1. A moisture-curable composition comprising:
(a) a moisture-curable silylated resin having the general Formula (I):

$$P[\text{-L-SiR}^1_a(OR^1)_{3-a}]_m \quad \text{Formula (I)}$$

wherein:
P is a polymer residue derived from at least one addition or condensation monomer, wherein the polymer residue P has a polymer backbone selected from the group consisting of polyether, polyester, polyether-co-polyester, polyester-co-polyether, polythioether, polyamine, polyamide, polyester-co-polyamide, polyacrylate, polyacetal, polycarbonate, polybutadiene, polyurethane and polyurea;

L is a divalent linking group;
each occurrence of $R^1$ is independently an alkyl group having from 1 to 6 carbon atoms, a phenyl group or an arenyl group having 7 to 12 carbon atoms;
each occurrence of subscript a is independently 0, 1 or 2; and
m is an integer from 1 to 15;
(b) a flexibilizer having the general Formula (II):

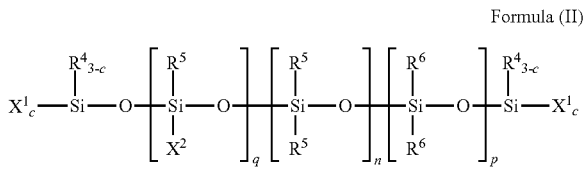

Formula (II)

wherein:
each occurrence of $R^4$ is independently an alkyl group having from 1 to 6 carbon atoms, a phenyl group or an arenyl group having 7 to 12 carbon atoms;

each occurrence of $R^5$ is independently an alkyl group having from 1 to 6 carbon atoms;
each occurrence of $R^6$ is independently a phenyl group or an arenyl group having 7 to 12 carbon atoms;
each occurrence of $X^1$ is independently a hydroxyl group, an alkoxy group having from 1 to 6 carbon atoms;
each occurrence of $X^2$ is independently a hydroxyl group, an alkoxy group having from 1 to 6 carbon atoms, or a group with the Formula (IIa):

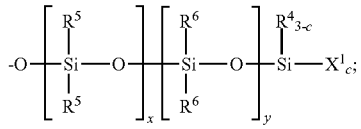

Formula (IIa)

$R^4$, $R^5$ and $R^6$ are the same as defined above;
each occurrence of subscripts e, n, p, q, x and y is independently an integer wherein c is 1 to 3; n is to 500, p is 1 to 500, q is 0 to 10, x is 0 to 50, and y is 0 to 50 with the provisos that
(1) the molar ratio of n to p is from 0 to 15, and
(2) the molar ratio of q to p is from 0 to 1; and,
(c) at least one curing catalyst.

2. The moisture-curable composition of claim 1 wherein linking group L in moisture-curable silylated resin (I) has the general Formula (Ia):

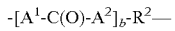 Formula (Ia);

wherein:
each occurrence of $R^2$ is independently a divalent hydrocarbylene group containing from 1 to 12 carbon atoms;
each occurrence of $A^1$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the provisos that when $A^1$ is oxygen or sulfur, then $A^2$ is $(—)NR^3$ and when a is 0, then $A^1$ is oxygen;
each occurrence of $A^2$ is independently selected from divalent oxygen (—O—), sulfur (—S—) or substituted nitrogen of the structure $(-)_2NR^3$, wherein $R^3$ is hydrogen, alkyl, alkenyl, arenyl, aryl, aralkyl, alkyl containing at least one ester functional group or —$R^2SiX^1X^2X^3$ group, wherein each $R^3$, other than hydrogen, contains from 1 to 18 carbon atoms, and with the proviso that when $A^2$ is oxygen or sulfur, then $A^1$ is $(-)_2NR^3$; and,
subscript b is 0 or 1.

3. The moisture-curable composition of claim 1 wherein polymer residue P of Formula (I) is selected from the group consisting of polyether, polyamine, polyurethane, and polyurea.

4. The moisture-curable composition of claim 1 wherein moisture-curable silylated resin of Formula (I) is obtained by the silylation of at least one silylatable polymer selected from the group consisting of polyether polyol, polyester polyol, hydroxyl-terminated polyacrylate, hydroxyl-terminated polybutadiene, polyether possessing terminal olefinic unsaturation, hydroxyl-terminated polyurethane, isocyanate-terminated polyurethanes, primary amine-terminated polyurea and secondary amine-terminated polyurea.

5. The moisture-curable composition of claim 3 wherein moisture-curable silylated resin of Formula (I) is obtained by the silylation of hydroxyl-terminated polyurethane with an isocyanatosilane.

6. The moisture-curable composition of claim 1 wherein each occurrence of $X^1$ is independently hydroxyl, methoxy, ethoxy, propoxy or isopropoxy; $R^4$ is methyl or phenyl; $R^5$ is methyl; $R^6$ is phenyl; n is 1 to 100; p is 2 to 100; q is 0; and the molar ratio of n to p is from 1 to 10.

7. The moisture-curable composition of claim 1 wherein flexibilizer of Formula (II) has a silanol content or a $SiX^1$ content of from 2 to 15 mole %, based upon the total number of silicon atoms.

8. The moisture-curable composition of claim 1 wherein flexibilizer of Formula (II) has a weight average molecular weight of from 500 to 50,000.

9. The moisture-curable composition of claim 1 wherein flexibilizer of Formula (II) is HO—Si(CH$_3$)$_2$—O—[Si(CH$_3$)$_2$O]$_r$—[Si(Ph)$_2$O]$_s$—Si(CH$_3$)$_2$—OH where r/s is 4.42, CH$_3$O—Si(CH$_3$)$_2$—O—[Si(CH$_3$)$_2$O]$_u$—[Si(Ph)$_2$O]$_w$—Si(CH$_3$)$_2$—OCH$_3$, where u/w is 2.99, or mixtures thereof.

10. The moisture-curable composition of claim 1 containing from 10 to 98 percent by weight moisture-curable silylated resin of Formula (I) based on the total weight of the moisture-curable composition, from 1 to 50 parts by weight flexibilizer of Formula (II) based on one hundred parts of the moisture-curable silylated resin, and from 0.001 to 10 parts by weight curing catalyst based on one hundred parts of the moisture-curable silylated resin.

11. The moisture-curable composition of claim 1 containing from 20 to 70 percent by weight moisture-curable silylated resin of Formula (I), from 1 to 30 parts by weight flexibilizer of Formula (II) based on one hundred parts of the moisture-curable silylated resin, and from 0.1 to 0.15 parts by weight curing catalyst based on one hundred parts of the moisture-curable silylated resin.

12. The moisture-curable composition of claim 1 wherein the curing catalyst is selected from the group consisting of organic tin, zirconium complex, aluminum chelate, titanic chelate, organic zinc, organic cobalt, organic iron, organic nickel and organobismuth, amine catalyst, dibutyltin oxide, dimethyltin diacetate, dimethyltin dilaurate, dimethyltin dineodecanote, dibutyltin dilaurate, dioctyltin dilaurate, dibutyltin diacetate, stannous octoate, stannous acetate, stannous oxide, morpholine, tri-isopropylamine, bis-(2-dimethylaminoethyl) ether and piperazine, and mixtures thereof.

13. The moisture-curable composition of claim 1, further comprising at least one additional component selected from the group consisting of organic solvent, aminosilane, polysiloxane resin other than Formula (II), isocyanate-reactive scavenging agent, water scavenger agent, desiccant, non-silicon-based epoxy hardener, surfactant, colorant, plasticizer, extender, filler, reinforcing agent, adhesion promoter, hydrocarbon resin modifier, UV stabilizer, wetting agent, flow and leveling additive, thixotrope and defoamer.

14. The moisture-curable composition of claim 13 wherein the filler is selected from the group consisting of fumed metal oxide, precipitated metal oxide, precipitated metal carbonate and carbon black, and having a concentration in the range of from 0 to 50 weight percent based on the total weight of components (a), (b), (c) and filler.

15. The moisture-curable composition of claim 13 wherein the plasticizer is liquid organic compound selected from the group consisting of alkyl phthalate, alkyl sulphate and polyether, and having a concentration in the range of from 0 to 40 parts by weight per hundred parts of the moisture-curable silylated resin of Formula (I).

16. The moisture-curable composition of claim 13 wherein the water scavenger agent is an alkoxysilane selected from the group consisting of vinyltrimethoxysilane and methyltrimethoxysilane, and having a concentration in the range of from 0 to 5 percent by weight, based on the weight of the moisture-curable silylated resin of Formula (I).

17. The moisture-curable composition of claim 13 wherein the adhesion promoter is an organofunctional alkoxysilane selected from the group consisting of 3-aminopropyltrimethoxysilane and gamma-glycidoxypropyltrimethoxysilane, and having a concentration in the range of from 0 to 5 percent by weight, based on the weight of the moisture-curable silylated resin of Formula (I).

18. The moisture-curable composition of claim 1 wherein the composition is an adhesive, a sealant, a composite or a coating.

19. The cured composition of claim 1.

20. A substrate having the cured composition of claim 19.

21. A substrate having the composition of claim 1 applied thereto.

22. The cured composition of claim 1 exhibiting at least one improved property compared to substantially the same cured moisture-curable composition lacking a flexibilizer.

23. The cured composition of claim 22 wherein the improved property is at least one of elongation and tear strength.

24. The cured composition of claim 23 wherein the improvement in elongation is at least 10% and the improvement in tear strength is at least 20%.

* * * * *